United States Patent
Zhang et al.

(10) Patent No.: US 12,346,818 B2
(45) Date of Patent: Jul. 1, 2025

(54) SYSTEMS AND METHODS FOR IMPLEMENTING FLEXIBLE, INPUT-ADAPTIVE DEEP LEARNING NEURAL NETWORKS

(71) Applicant: Board of Trustees of Michigan State University, East Lansing, MI (US)

(72) Inventors: Mi Zhang, Okemos, MI (US); Biyi Fang, Lansing, MI (US); Xiao Zeng, Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 663 days.

(21) Appl. No.: 16/997,885

(22) Filed: Aug. 19, 2020

(65) Prior Publication Data
US 2021/0056357 A1 Feb. 25, 2021

Related U.S. Application Data

(60) Provisional application No. 62/888,688, filed on Aug. 19, 2019.

(51) Int. Cl.
*G06N 3/084* (2023.01)
*G06F 16/55* (2019.01)
(Continued)

(52) U.S. Cl.
CPC ............. *G06N 3/084* (2013.01); *G06F 16/55* (2019.01); *G06F 18/217* (2023.01); *G06N 3/04* (2013.01);
(Continued)

(58) Field of Classification Search
CPC G06N 3/084; G06N 3/04; G06N 3/08; G06N 3/045; G06N 3/048; G06N 3/082;
(Continued)

(56) References Cited

U.S. PATENT DOCUMENTS

| | | | | |
|---|---|---|---|---|
| 5,339,818 A | * | 8/1994 | Baker | .................... G16H 50/20 600/490 |
| 10,387,752 B1 | * | 8/2019 | Kim | .................... G06V 10/774 |

(Continued)

OTHER PUBLICATIONS

Abadi, M. et al. Tensorflow: a system for large-scale machine learning. In OSDI, vol. 16, pp. 265-283, 2016.
(Continued)

*Primary Examiner* — Solomon G Bezuayehu
(74) *Attorney, Agent, or Firm* — QUARLES & BRADY LLP

(57) ABSTRACT

The present disclosure describes systems and methods for implementing input-adaptive neural networks. Several approaches and systems are presented for creating flexible and computationally-efficient deep neural networks that adapt their complexity based upon input data such as video streams. The approach may use fine-grained design and an automatic approach for generating optimal network architectures based on early-exit mechanisms. A neural network modified according to such principles can be implemented in various devices including mobile vision systems such as smartphones, drones, and head-mounted augmented reality devices.

9 Claims, 28 Drawing Sheets
(26 of 28 Drawing Sheet(s) Filed in Color)

(51) Int. Cl.
    *G06F 18/21*     (2023.01)
    *G06N 3/04*     (2023.01)
    *G06N 3/08*     (2023.01)
    *G06V 10/764*     (2022.01)
    *G06V 10/82*     (2022.01)
    *G06V 20/40*     (2022.01)

(52) U.S. Cl.
    CPC ............ *G06N 3/08* (2013.01); *G06V 10/764* (2022.01); *G06V 10/82* (2022.01); *G06V 20/40* (2022.01)

(58) Field of Classification Search
    CPc ..... G06F 16/55; G06F 18/217; G06V 10/764; G06V 10/82; G06V 20/40
    See application file for complete search history.

(56) References Cited

U.S. PATENT DOCUMENTS

| | | | | |
|---|---|---|---|---|
| 10,467,729 | B1* | 11/2019 | Perera | G06T 3/4046 |
| 10,515,312 | B1* | 12/2019 | Kubo | G06N 3/04 |
| 2017/0206426 | A1* | 7/2017 | Schrier | G06V 10/82 |
| 2017/0270374 | A1* | 9/2017 | Myers | G06V 40/103 |
| 2018/0114110 | A1* | 4/2018 | Han | G06N 3/082 |
| 2018/0114114 | A1* | 4/2018 | Molchanov | G06N 3/045 |
| 2018/0336468 | A1* | 11/2018 | Kadav | G06V 10/454 |
| 2018/0350071 | A1* | 12/2018 | Purwar | G06N 3/08 |
| 2019/0019050 | A1* | 1/2019 | Roblek | G06T 7/11 |
| 2019/0042884 | A1* | 2/2019 | Guim Bernat | G06N 3/08 |
| 2019/0180168 | A1* | 6/2019 | Barad | G06N 3/04 |
| 2019/0266236 | A1* | 8/2019 | Battach | G06N 3/045 |
| 2019/0366153 | A1* | 12/2019 | Zhang | G06V 10/82 |
| 2019/0370662 | A1* | 12/2019 | Song | G06N 3/088 |
| 2020/0057916 | A1* | 2/2020 | Yamamoto | G06V 10/764 |
| 2020/0202214 | A1* | 6/2020 | Peranandam | G06N 3/082 |
| 2020/0210834 | A1* | 7/2020 | D'Ercoli | G06F 9/5077 |
| 2020/0356813 | A1* | 11/2020 | Sharma | G06V 10/17 |
| 2020/0364889 | A1* | 11/2020 | Tsai | G01N 21/3581 |
| 2020/0371524 | A1* | 11/2020 | Parchami | G06N 3/045 |
| 2021/0011288 | A1* | 1/2021 | Lai | H04N 13/106 |
| 2021/0012178 | A1* | 1/2021 | Venkatesh | G06N 3/063 |
| 2021/0049448 | A1* | 2/2021 | Li | G06N 3/084 |
| 2021/0068791 | A1* | 3/2021 | Gebre | G16H 50/30 |
| 2021/0089841 | A1* | 3/2021 | Mithun | G06T 7/90 |
| 2021/0216747 | A1* | 7/2021 | Rodyushkin | G06N 3/08 |
| 2022/0004858 | A1* | 1/2022 | Lee | G06N 3/084 |

OTHER PUBLICATIONS

Bahl, P. et al. Vision: cloud-powered sight for all: showing the cloud what you see. In Proceedings of the third ACM workshop on Mobile cloud computing and services, pp. 53-60, 2012.
Chollet F. Xception: Deep learning with depthwise separable convolutions. arXiv preprint, pp. 1610-02357, 2017.
DJI Mavic Pro. https://www.dji.com/mavic, 2018.
Fang, B. et al. Nestdnn: Resource-aware multi-tenant on-device deep learning for continuous mobile vision. In MobiCom, 2018.
Han, S. et al. Deep compression: Compressing deep neural networks with pruning, trained quantization and huffman coding. arXiv preprint arXiv:1510.00149, 2015.
Han, S. et al. Learning both weights and connections for efficient neural network. In Advances in Neural Information Processing Systems, pp. 1135-1143, 2015.
Han, S. et al. Mcdnn: An approximation-based execution framework for deep stream processing under resource constraints. In MobiSys, 2016.
He, K. et al. Deep residual learning for image recognition. In Proceedings of the IEEE conference on computer vision and pattern recognition, pp. 770-778, 2016.
Howard, A.G. et al. MobileNets: Efficient convolutional neural networks for mobile vision applications. arXiv preprint arXiv:1704.04861, 2017.
Huang, G. et al. Multi-scale dense networks for resource efficient image classification. arXiv preprint arXiv:1703.09844, 2017.
Huynh, L.N et al. DeepMon: Mobile gpu-based deep learning framework for continuous vision applications. In MobiSys, 2017.
Jiang, J. et al. Chameleon: scalable adaptation of video analytics. In Proceedings of the 2018 Conference of the ACM Special Interest Group on Data Communication, pp. 253-266. ACM, 2018.
Jiang, S. et al. Scylla: Qoe-aware continuous mobile vision with fpga-based dynamic deep neural network reconfiguration. In IEEE Conference on Computer Communications (INFOCOM), pp. 1369-1378. IEEE, 2020.
Karpathy, A. et al. Large-scale video classification with convolutional neural networks. In Proceedings of the IEEE conference on Computer Vision and Pattern Recognition, pp. 1725-1732, 2014.
Khan, M.A. et al. Uav-based traffic analysis: a universal guiding framework based on literature survey. Elsevier Science BV, 2017.
Lecun, Y. et al. Deep learning. Nature, 521(7553):436-444, 2015.
Li, H. et al. Pruning filters for efficient convnets. arXiv preprint arXiv:1608.08710, 2016.
Likamwa R. et al. Starfish: Efficient concurrency support for computer vision applications. In Proceedings of the 13th Annual International Conference on Mobile Systems, Applications, and Services, pp. 213-226. ACM, 2015.
Liu L. et al. Dynamic deep neural networks: Optimizing accuracy-efficiency trade-offs by selective execution. arXiv preprint arXiv:1701.00299, 2017.
Liu, C. et al. Progressive neural architecture search. In Proceedings of the European Conference on Computer Vision (ECCV), pp. 19-34, 2018.
Liu, S. et al. On-demand deep model compression for mobile devices: A usage-driven model selection framework. 2018.
Mathur, A. et al. Deepeye: Resource efficient local execution of multiple deep vision models using wearable commodity hardware. In Proceedings of the 15th Annual International Conference on Mobile Systems, Applications, and Services, pp. 68-81. ACM, 2017.
Naderiparizi, S. et al. Glimpse: A programmable early-discard camera architecture for continuous mobile vision. In Proceedings of the 15th Annual International Conference on Mobile Systems, Applications, and Services, pp. 292-305. ACM, 2017.
NVIDIA Jetson AGX Xavier Developer Kit. https://developer.nvidia.com/embedded/buy/jetson-xavier-devkit, 2018.
Sandler, M. et al. Mobilenetv2: Inverted residuals and linear bottlenecks. In IEEE CVPR, pp. 4510-4520, 2018.
Shen, H. et al. Fast video classification via adaptive cascading of deep models. In CVPR, 2017.
Simonyan K. et al. Very deep convolutional networks for large-scale image recognition. arXiv preprint arXiv:1409.1556, 2014.
Soomro, K. et al. Ucf101: A dataset of 101 human actions classes from videos in the wild. arXiv:1212.0402, 2012.
Sze, V. et al. Efficient processing of deep neural networks: A tutorial and survey. Proceedings of the IEEE, 105 (12):2295-2329, 2017.
Szegedy, C. et al. Rethinking the inception architecture for computer vision. In Proceedings of the IEEE conference on computer vision and pattern recognition, pp. 2818-2826, 2016.
Teerapittayanon, S. et al. Branchynet: Fast inference via early exiting from deep neural networks. In ICPR, pp. 2464-2469. IEEE, 2016.
Walther, D.B. et al. Simple line drawings suffice for functional mri decoding of natural scene categories. Proceedings of the National Academy of Sciences, 108(23):9661-9666, 2011.
Wang, J. et al. Bandwidth-efficient live video analytics for drones via edge computing. In 2018 IEEE/ACM Symposium on Edge Computing (SEC), pp. 159-173. IEEE, 2018.
Wang, J. et al. Edge-based live video analytics for drones. IEEE Internet Computing, 23(4):27-34, 2019.
Xu, M. et al. Deepcache: Principled cache for mobile deepvision. In Proceedings of the 24th Annual International Conference on Mobile Computing and Networking, pp. 129-144. ACM, 2018.
Yang, T. et al. Mutualnet: Adaptive convnet via mutual learning from network width and resolution. In European Conference on Computer Vision (ECCV), 2020.

(56) References Cited

OTHER PUBLICATIONS

Yang, T.-J. et al. Netadapt: Platform-aware neural network adaptation for mobile applications. In Proceedings of ECCV, pp. 285-300, 2018.
Zhang, H. et al. Live video analytics at scale with approximation and delay-tolerance. In NSDI, vol. 9, p. 1, 2017.
Zhou, B. et al. Places: A 10 million image database for scene recognition. IEEE Transactions on Pattern Analysis and Machine Intelligence, 2017.
Zoph, B. et al. Learning transferable res for scalable image recognition. In IEEE Cvpr, pp. 697-8710, 2018.

\* cited by examiner

FIG. 8A
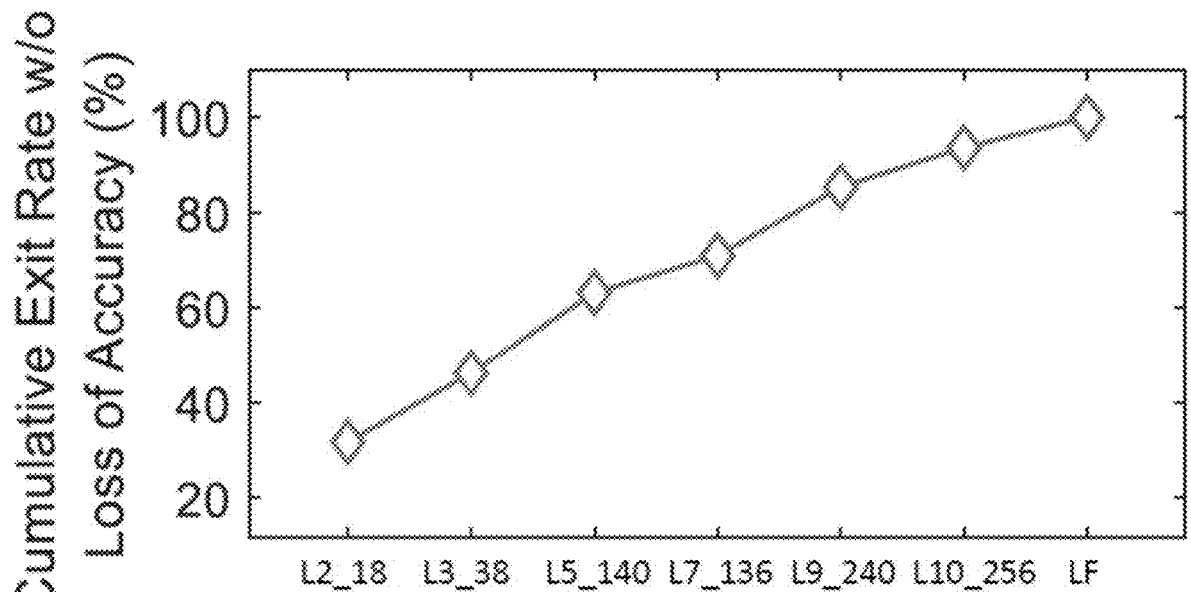
M1-U
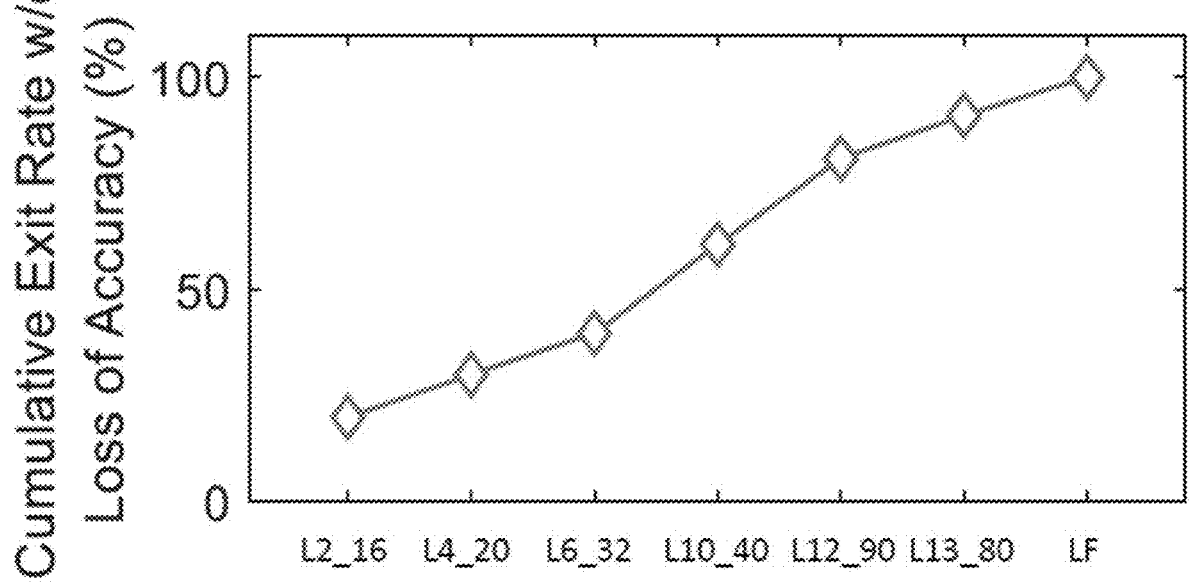
M2-U
FIG. 8B

FIG. 8C
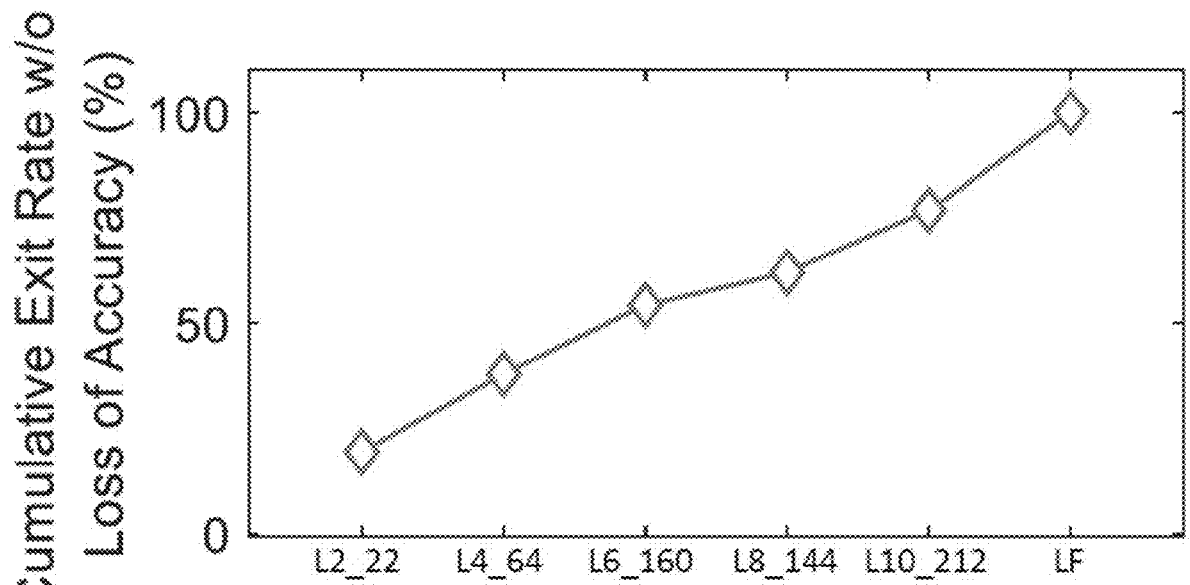
M1-P
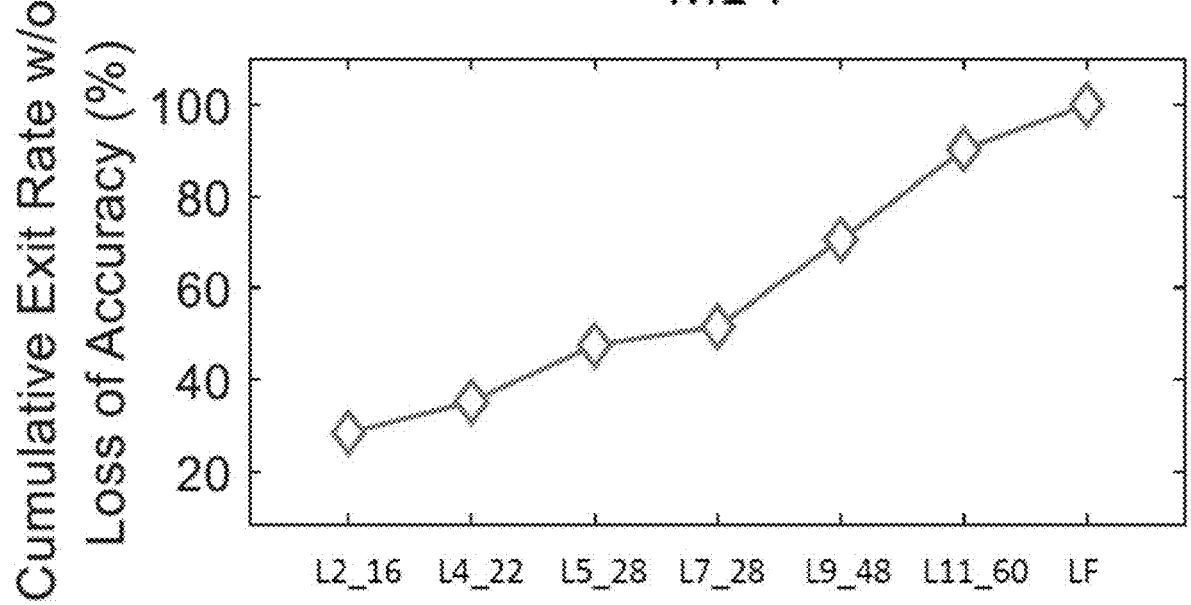
M2-P
FIG. 8D

FIG. 8E
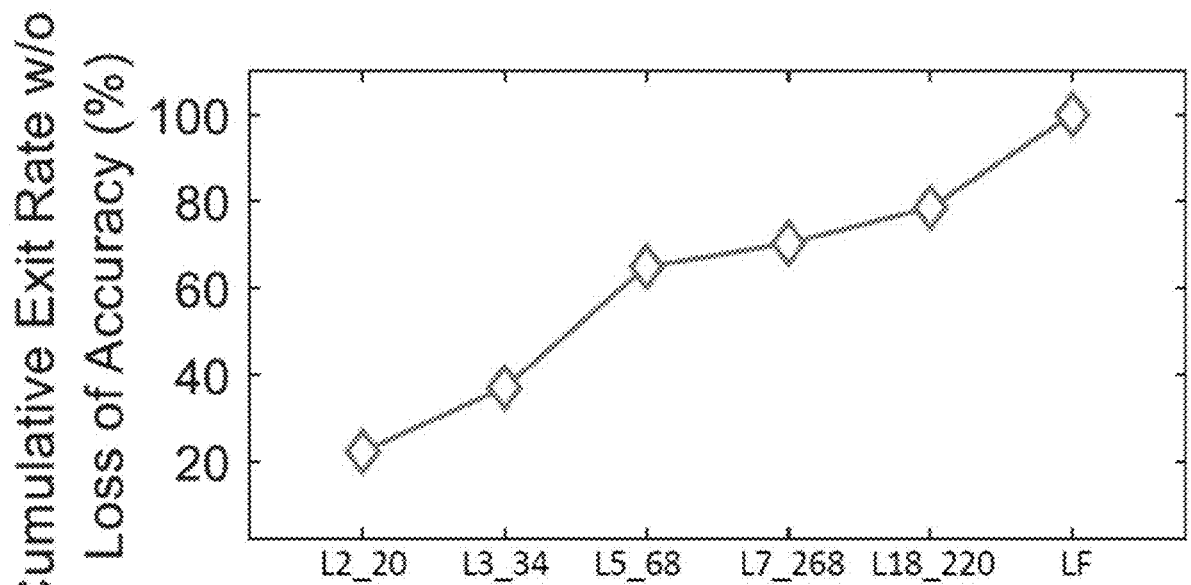
M1-T
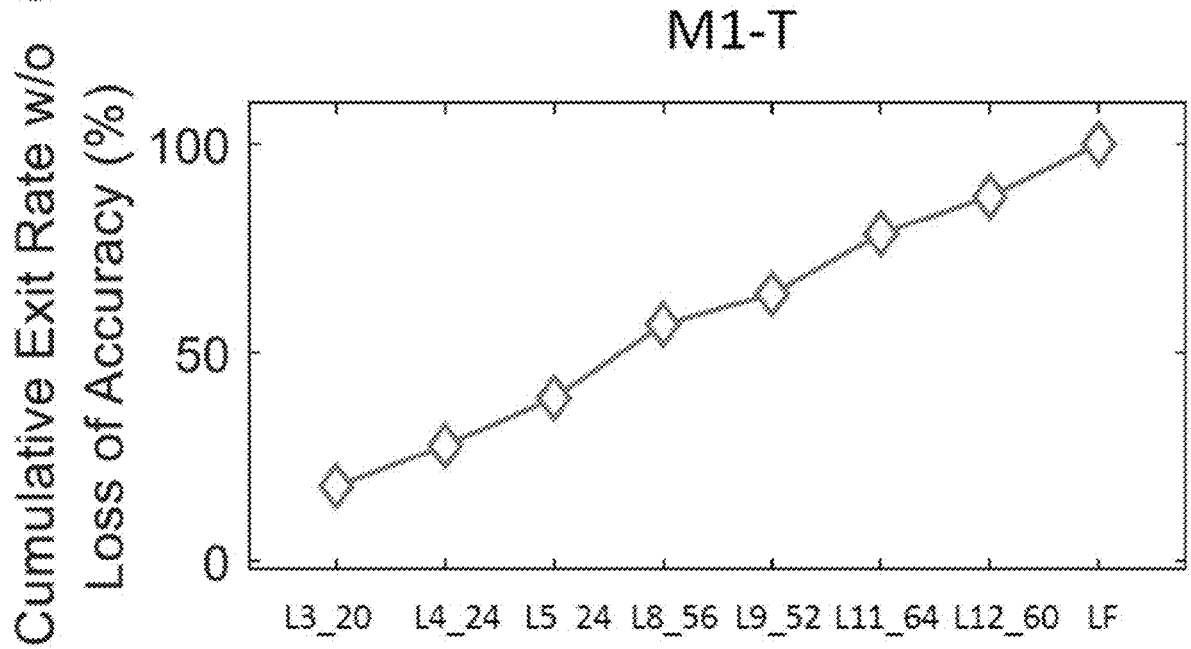
M2-T
FIG. 8F

M1-U

M2-U

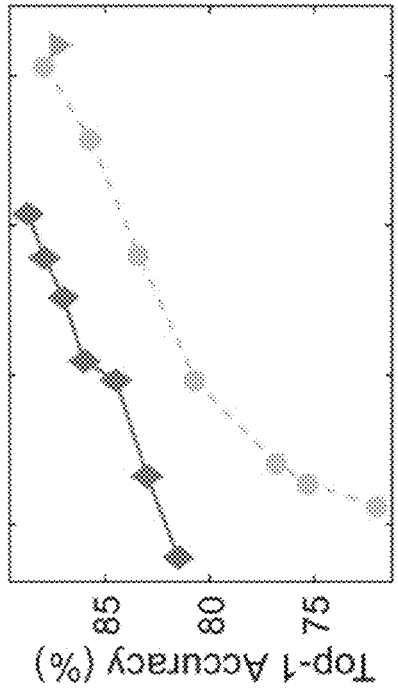
FIG. 11B  M2-U
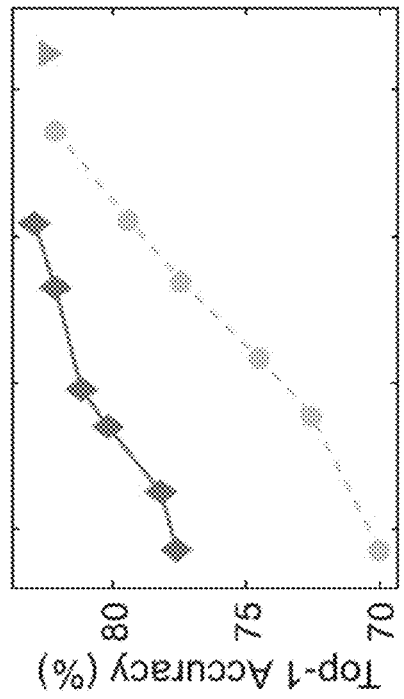
FIG. 11D  M2-P
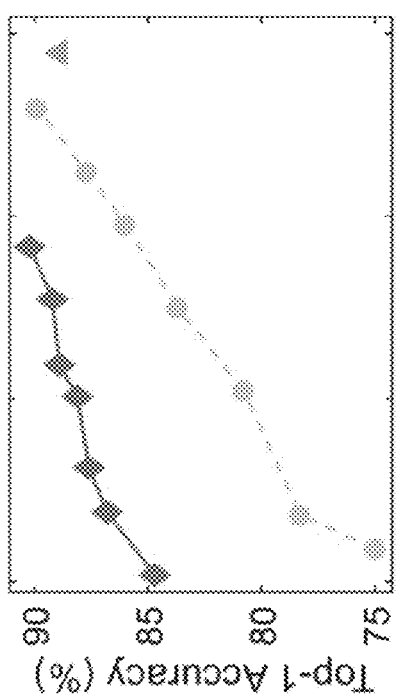
FIG. 11A  M1-U
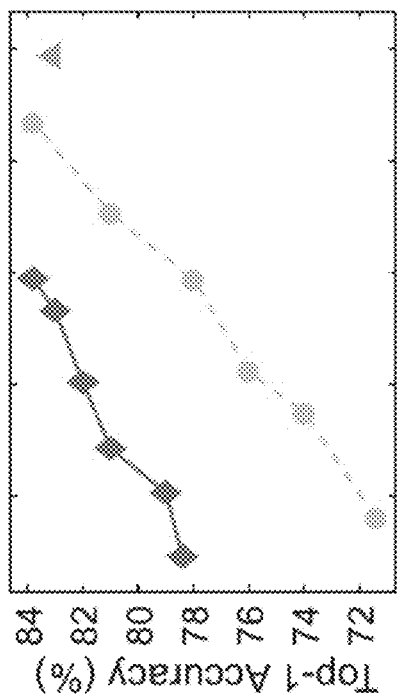
FIG. 11C  M1-P

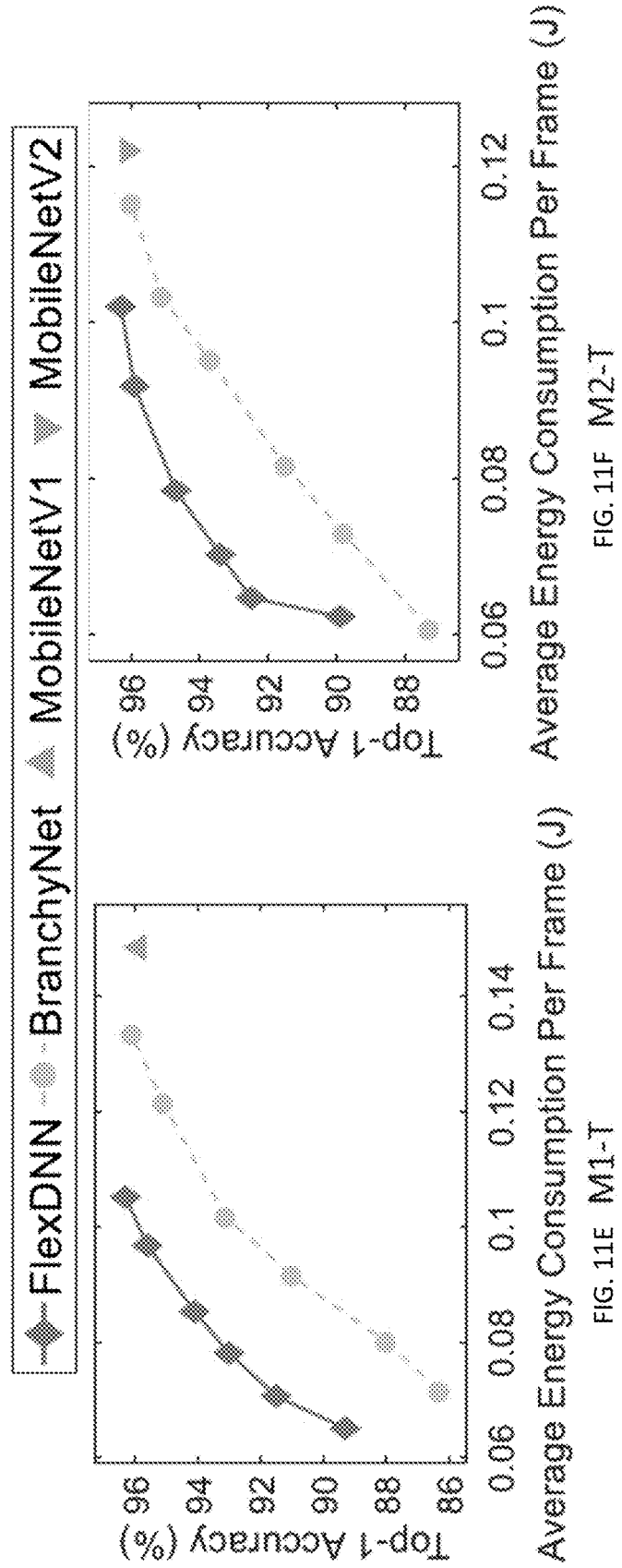

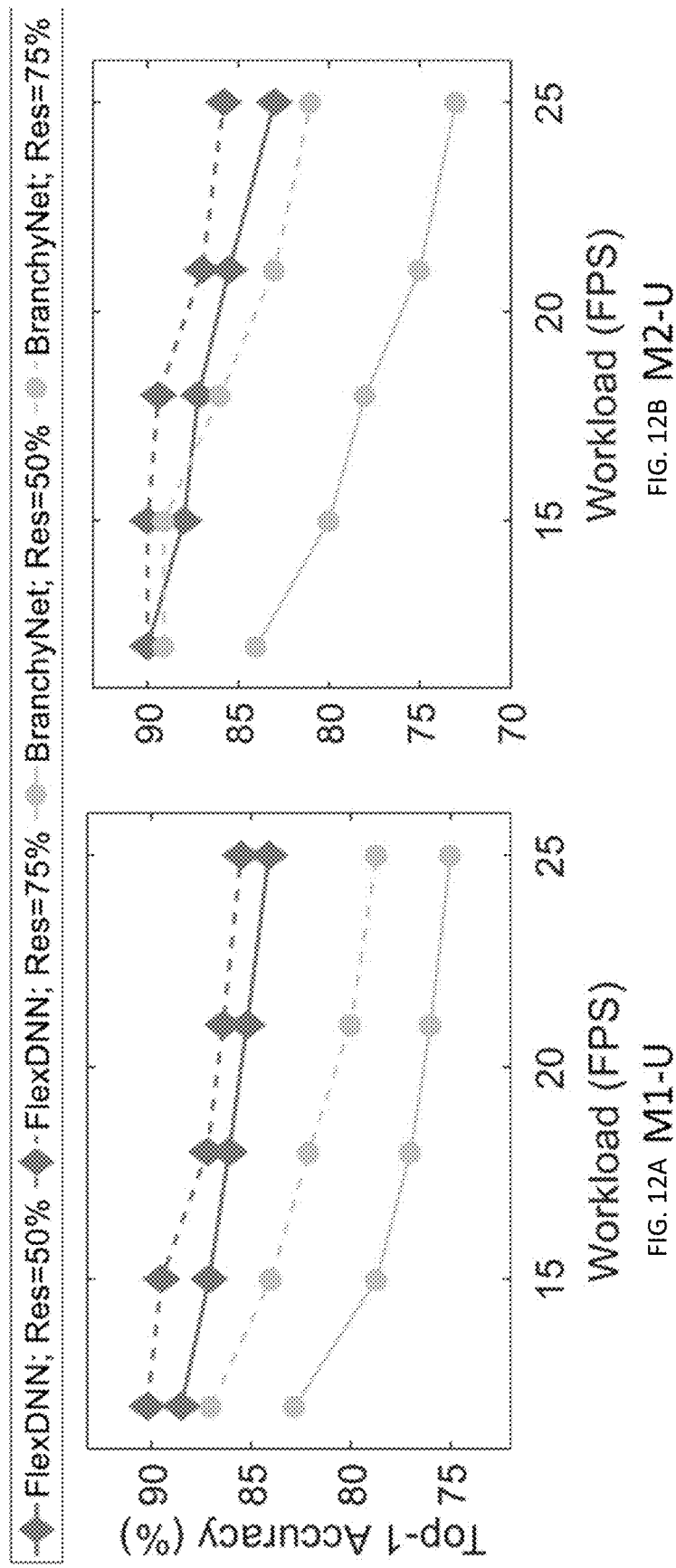
FIG. 12A M1-U
FIG. 12B M2-U

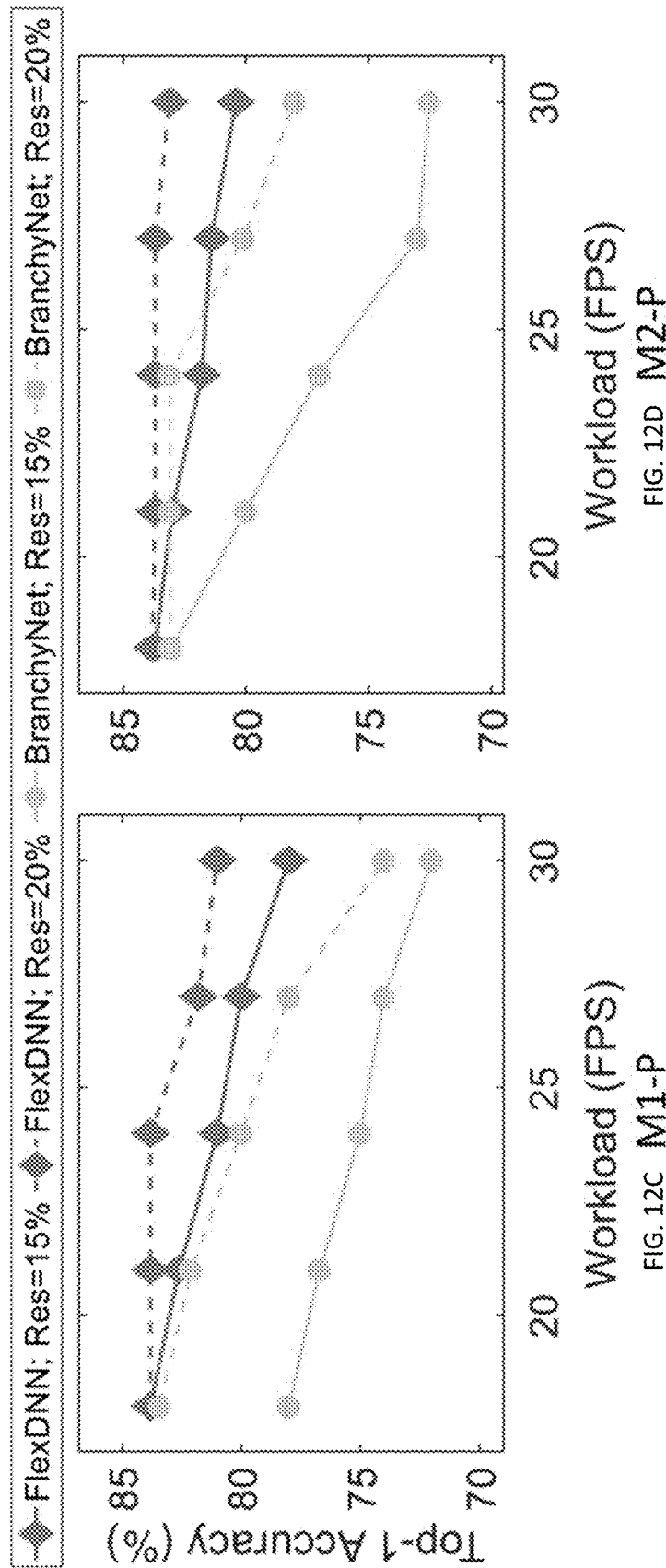

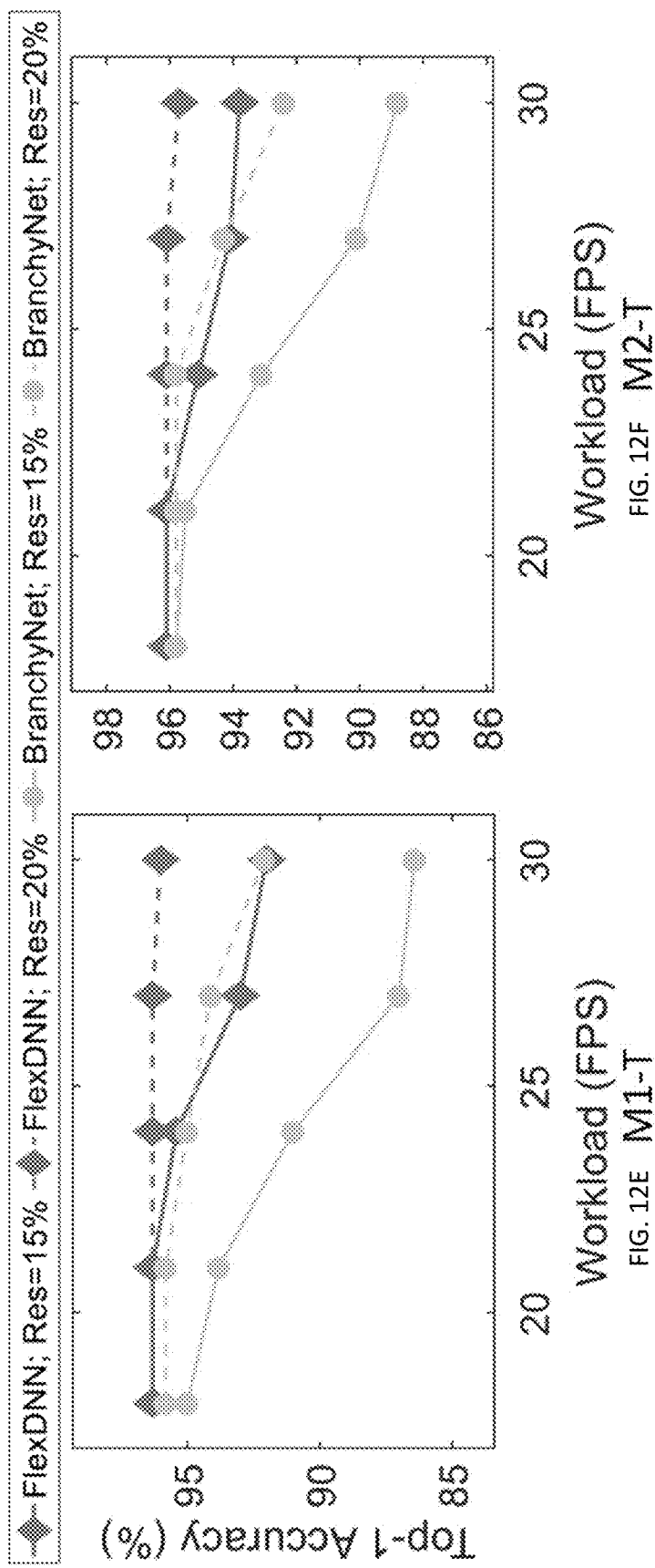
FIG. 12E  M1-T
FIG. 12F  M2-T

SYSTEMS AND METHODS FOR IMPLEMENTING FLEXIBLE, INPUT-ADAPTIVE DEEP LEARNING NEURAL NETWORKS

CROSS-REFERENCE TO RELATED APPLICATIONS

This application claims priority to U.S. Provisional Application No. 62/888,688, filed on Aug. 19, 2019, which is herein incorporated by reference in full.

STATEMENT REGARDING FEDERALLY SPONSORED RESEARCH

This invention was made with government support under 1632051 and under 1617627 awarded by the National Science Foundation. The government has certain rights in the invention.

BACKGROUND

Mobile systems such as mobile phones, drones, and augmented reality headsets are ubiquitous today. However, these and other resource-constrained systems often have limited computational power, limited memory, or limited energy resources; or they may have functional requirements for speed of processing (e.g., autonomous vehicles must process inputs in real time with minimal latency). Driven by the recent breakthrough in Deep Neural Networks (DNNs) and the emergence of AI chipsets, state-of-the-art mobile systems have started to use DNN-based processing pipelines for on-device processing of real time inputs (e.g., video stream analytics), which can enable a wide range of continuous mobile vision applications.

On-device video stream analytics requires processing streaming video frames at high throughput and returning the processing results with low latency. Unfortunately, DNNs are known to be computationally expensive, and high computational consumption directly translates to high processing latency and high energy consumption. Given mobile systems are constrained by limited computational resources and battery capacities, reducing computational consumption of DNN-based pipelines is crucial to high-throughput, low-latency, and low-energy on-device video stream analytics.

Some prior attempts to reduce computational consumption of DNNs in mobile applications involved various techniques for compressing the DNN model. However, these model compression techniques yield one-size-fits-all neural networks, and using them for video stream analytics would involve extracting the same set of feature maps for all video frames agnostic to the content of each video frame. This results in inefficiencies.

In fact, the computation consumed by a DNN-based processing pipeline is heavily dependent on the content of the video frames. For video frames with contents that are easy to recognize, a small low-capacity DNN model is sufficient while a large high-capacity DNN model that consumes more computation is overkill; on the other hand, for video frames with contents that are hard to recognize, it is necessary to employ large high-capacity DNN models in the processing pipeline to ensure the contents to be correctly recognized. This is very similar to how human vision system works where a glimpse is sufficient to recognize simple scenes and objects in ordinary poses, whereas more attention and efforts are needed to understand complex scenes and objects that are complicated or partially occluded.

Based on this key insight, video stream analytics systems such as "Chameleon" have recently emerged. Leveraging the dynamics of video contents, these systems effectively reduce the computational consumption of the DNN-based processing pipeline by dynamically changing the DNN models in the pipeline to adapt to the difficulty levels of the video frames. However, this dynamic configuration approach is not suitable or ideal for use in resource-constrained systems, such as mobile systems. This is because systems like "Chameleon" can require all the model variants with various capacities to be installed in the mobile system, which results in a large memory footprint. More importantly, if a large number of model variants is incorporated and the content dynamics is substantial, the overhead of searching for the optimal model variant and switching models at runtime can be prohibitively expensive (from a computational standpoint), which considerably dwarfs the benefit brought by the adaptation. The limitation of systems like "Chameleon" is rooted in their requirement of having multiple model variants with various capacities to adapt to various difficulty levels of the video frames. To address this limitation, some other approaches such as "BranchyNet" and "MSDNet" involved constructing a single model by adding "early exits" at layers of a regular DNN model to make early classification decisions. With these early prediction mechanisms, "easy" frames do not need to go through all the layers of the DNN model, and their computational consumption is thus reduced. Unfortunately, these approaches are constrained by the following limitations.

BranchyNet and MSDNet are both coarse-grained approaches where early exits are inserted at the outputs of convolutional layers of a DNN model. However, each convolutional layer is composed of a large number of convolutional filters, and these filters dominate the computational consumption of the DNN model. Not all the filters within each convolutional layer are needed to early exit easy frames. As a consequence, computation consumed by those unnecessary filters is wasted by the coarse-grained approach due to its constraint on making early predictions at the granularity of layers.

The early exits themselves also consume computation. Computation consumed by frames that fail to exit at the early exits is wasted. This wasted computation can be thought of as part of the "overhead" incurred by coarse-grained approaches. Unfortunately, the early exit architecture of BranchyNet and MSD-Net is manually designed based on heuristics without focusing on the trade-off between early exit rates and the incurred overheads. Without carefully accounting for the trade-off, the incurred overheads could largely diminish the benefit of early exits.

Lastly, in BranchyNet and MSDNet, the number and locations of the inserted early exits are manually determined, in reliance upon the domain expertise of the programmer. While effective in comparison to models without early exits, considering the exponential combinations of the number and locations of early exits, even for developers with extensive domain expertise, without considerable efforts on trial and error, it would be extremely challenging to derive an early exit insertion plan that can fully leverage the computational consumption reduction benefit brought by early exits. Moreover, since early exits incur computational overhead, the number and locations of the inserted early exits play a critical role in determining the amount of computation that can be saved, making the derivation of the "coarse-grained" early exit insertion plan even more complicated.

To achieve adaptation, existing solutions such as Chameleon use dynamic configuration while BranchyNet and MSDNet use inserted early exits for early prediction. There are many drawbacks of these configurations, discussed below, which also help illustrate the advantages of the novel techniques disclosed herein.

A dynamic configuration approach is not well suited to mobile platforms. Chameleon is one of the first content-aware video stream analytics systems to use dynamic configuration to achieve content adaptation. While effective as a solution for resourceful systems, dynamic configuration is a mismatch to resource-constrained mobile platforms for several reasons. First, a dynamic configuration approach requires all the model variants with various capacities to be installed in the mobile system, which is not a scalable solution and could lead to an undesirable requirement of a large memory footprint. Second, dynamic configuration incurs large overheads on searching for the optimal model variant and model switching at runtime. Take model switching as an example. Model switching involves two steps each of which can in practice require substantial computation: model initialization (i.e., allocating memory space for the model to switch to) and parameter loading (i.e., loading the model parameters into the allocated memory space).

BranchyNet and MSDNet attempted to address the issues of dynamic configuration by adding early exits at layers of a DNN model. While such concept is promising, the limitations with BranchyNet and MSDNet can be demonstrated in three respects. First, BranchyNet and MSDNet are coarse-grained. The early predictions are constrained to be made only at the outputs of convolutional layers. Second, the early exit architecture of BranchyNet and MSDNet is manually designed based on heuristics without focusing on minimizing the overheads incurred by early exits. Without carefully designing the architecture of each inserted early exit, the incurred overheads could considerably diminish the benefit of early exits. Lastly, the number and locations of the inserted early exits in BranchyNet and MSDNet are manually determined, which can introduce user error and substantial inefficiency. Unfortunately, the search space is exponential in terms of number and locations. For example, ResNet-110, the DNN model used by BranchyNet, contains 109 layers to insert early exits, which translates into 2^109 combinations of different insertion plans. Even if we only consider inserting two early exits, that would still be 5,886 combinations. Manually navigating through such exponential search space is a tedious, error-prone, and impractical process even for developers with extensive domain expertise.

SUMMARY

The present disclosure provides systems and methods for generating and implementing Deep Neural Networks with flexible size based upon smart and dynamic early exit strategies. In one implementation, these systems and methods can be utilized to process video data in a mobile device, using a sophisticated DNN, while saving memory and power and limiting computational latency.

In one aspect, the present disclosure provides a system for processing inputs using a neural network. The system includes a processor, at least one data input source, a memory having a set of instructions stored thereon, which when executed by the processor, cause the system to acquire a series of input data units from the data input source, process a first data unit of the series using an input-adaptive neural network, process a second data unit of the series using the input-adaptive neural network, wherein computational demand of processing the second data unit is reduced based upon at least one context characteristic of the second data unit, and outputting a result.

In the system, the at least one data input source can be a video camera.

In the system, the input data units can be image frames.

In the system, the content adaptive neural network can be a convolutional neural network having an early exit architecture that was determined via an automated process.

In the system, the content characteristic can include at least one of a computational resource availability, a power resource availability, a user setting, or a characteristic of the second data unit.

In the system, the instructions further can cause the system to process a third data unit using the input-adaptive neural network, wherein the computational demand of the third data unit is different than the computational demand of processing the first and second data units and is based upon at least one context characteristic of the third data unit.

The present disclosure also provides a method for generating a input-adaptive deep neural network. The method includes obtaining a trained deep neural network model, assessing importance of filters of the model, determining an early exit architecture for the model using an automated process based on the assessed importance, profiling an accuracy-resource tradeoff of the model for a device, and loading the model into a memory of the device.

The present disclosure also provides a method for processing video streams using a neural network. The method includes receiving a video stream via a mobile device, receiving an indication of resource demand for the mobile device prior to processing a frame of the video stream, adjusting an accuracy profile variable of a neural network based upon the indication of resource demand, and processing the frame using the neural network, wherein at least one of a computational requirement or an energy requirement of the neural network is adjusted based upon the resource demand.

In the method, the indication of resource demand can include an indication of the frame rate of the video stream. The indication of resource demand can further include an indication of real time computational resource availability of the mobile device.

In another aspect, the present disclosure provides a system for modifying neural networks. The system includes at least one server in communication with a user portal, the user portal allowing a user to provide at least one of a trained deep neural network, or a dataset, and a memory connected to the at least one server, the memory having stored thereon a set of instructions which, when executed by the server, cause the server to: generate a trained deep neural network using the dataset, if the user provided a dataset; perform an early exit architecture search on the user-provided trained deep neural network if the user provided one, or the generated trained deep neural network if the user provided a dataset; add early exit branches at layers of the trained deep neural network; determine a confidence threshold for early exits of the trained deep neural network; and return an input-adaptive version of the trained deep neural network to the user.

In yet another aspect, the present disclosure provides a system for processing sensor inputs comprising: at least one processor; at least one sensor, connected to provide a stream of input data to the at least one processor; and at least one memory connected to the processor and having stored thereon a set of software instructions, including an input-adaptive deep learning model. The model includes a base deep neural network model, the model having a set of base convolutional layers; early exit branches associated with a portion of the base convolutional layers, the early exit branches comprising reduced layers trained to process intermediate features generated by the base convolutional layers for units of the input data; and decision modules that compare the output of the early exit branches to a confidence threshold and cause a given unit of the input data to exit the base deep neural network model if the output of the early exit branch is above the threshold or resume the base deep neural network model of the output of the early exit branch is below the threshold.

The foregoing and other aspects and advantages of the invention will appear from the following description. In the description, reference is made to the accompanying drawings that form a part hereof, and in which there is shown by way of illustration a preferred embodiment of the invention. Such embodiment does not necessarily represent the full scope of the invention, however, and reference is made therefore to the claims and herein for interpreting the scope of the invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 8(a)-(f) show locations of inserted early exits in model layers of various model techniques.

FIGS. 11(a)-(f) show energy consumption of various input-adaptive DNN techniques.

FIGS. 12(a)-(f) show performance results for various DNNs using flexible early exit architecture techniques.

DETAILED DESCRIPTION

Various systems and methods are disclosed herein for overcoming the disadvantages of the prior art. The systems and methods herein implement various features and aspects that make them useful for any situation in which it would be beneficial to reduce computational demand of a deep neural network application where the input data set has varying complexity. For example, these systems and methods could find application via a server network that is processing large amounts of variable inputs, such as a large image dataset (e.g., from a social media network, or electronic medical record set). Alternatively, they could find application in a mobile device that is processing audio inputs. Another example would be processing an input video stream using a deep neural network using a mobile device (i.e., wherein each frame of the video stream would be processed by the network, with some frames being comparatively "easy" to process).

Figure 1D:
FIG. 1(d) shows a fourth frame of a video clip of a human biking.
Figure 1C:
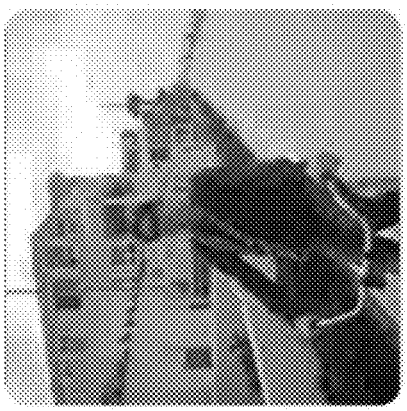
FIG. 1(c) shows a third frame of a video clip of the human biking.
Figure 1B:
FIG. 1(b) shows a second frame of a video clip of the human biking.
Figure 1A:
FIG. 1(a) shows a first frame of a video clip of a human biking.

Due to mobility of cameras, videos taken in real-world mobile settings exhibit substantial content dynamics in terms of difficulty level across frames over time. To illustrate this, FIG. 1 shows four frames of a video clip of a human biking captured using a mobile camera in the human activity video dataset UCF-101. Among them, since the entirety of both the biker and her bike is captured, the frames of FIG. 1(a) and FIG. 1(d) are relatively easier to recognize as biking activity. In contrast, the frames of FIG. 1(b) and FIG. 1(c) capture the biker with only part of the bike, and are thus relatively harder to recognize. In such case, a smaller model is sufficient for the frames of FIG. 1(a) and FIG. 1(d), but a more complex model is necessary for the frames of FIG. 1(b) and FIG. 1(c).

The intrinsic dynamics of video contents create an opportunity to reduce computational consumption by matching the capacity of the DNN model to the difficulty level of each video frame. To quantify how much computational consumption can be reduced, the minimum computational consumption is profiled in terms of the number of floating point operations (FLOPs) that is needed to correctly recognize the content in each frame of a 400-frame video clip. Specifically, ten model variants are derived with different capacities from MobileNetV1 by varying its numbers of layers and filters. For each frame, the model variant with the lowest FLOPs that is able to correctly recognize the content in that particular frame (optimal model) is selected. The selected model is then compared to the model variant with the lowest FLOPs that is able to correctly recognize the contents in all 400 frames (one-size-fits-all model) frame by frame.

Figure 2A:
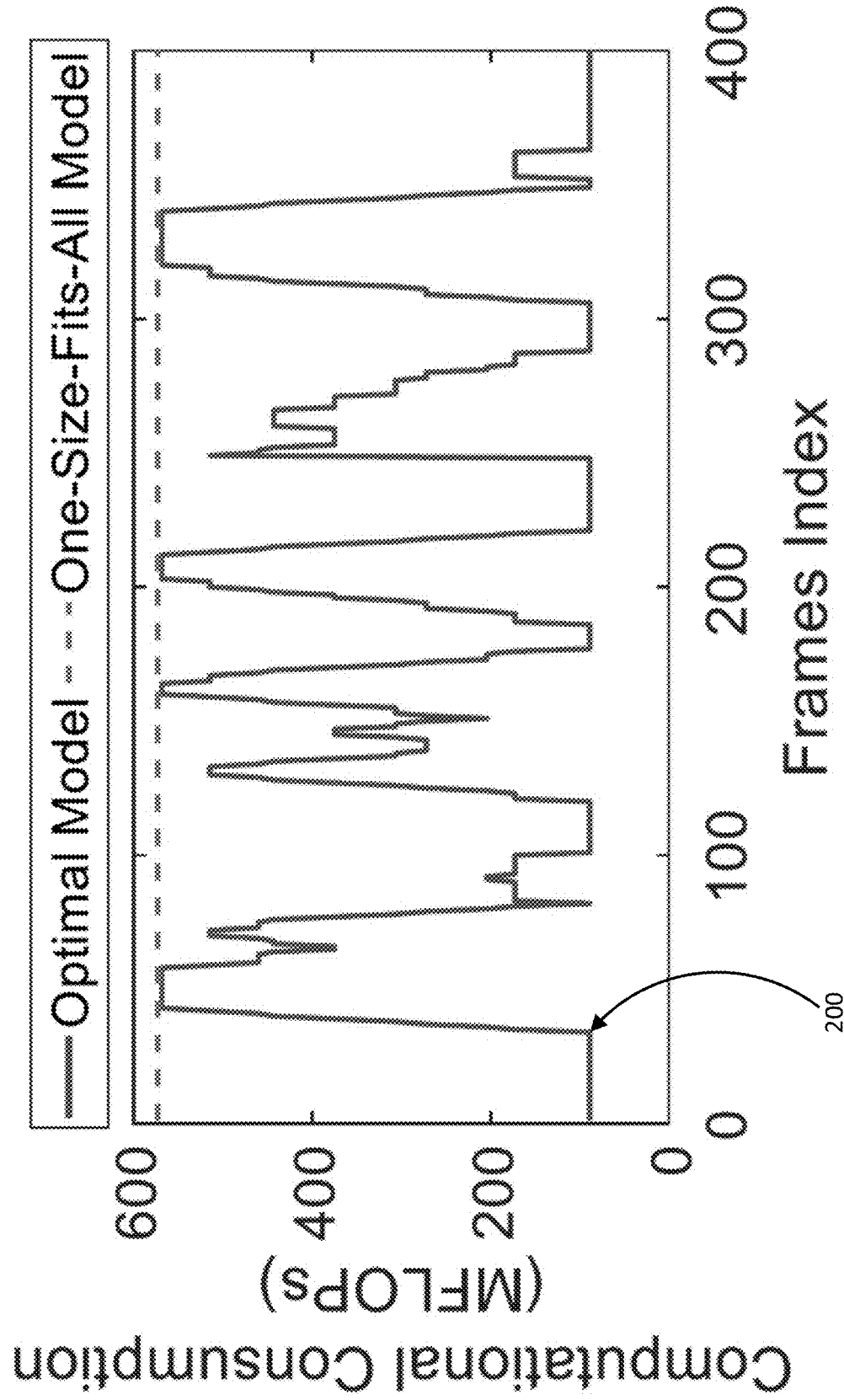
FIG. 2(a) shows a graph of minimum computational consumption for recognizing the content a given frame of a set of video frames for different approaches.
Figure 2B:
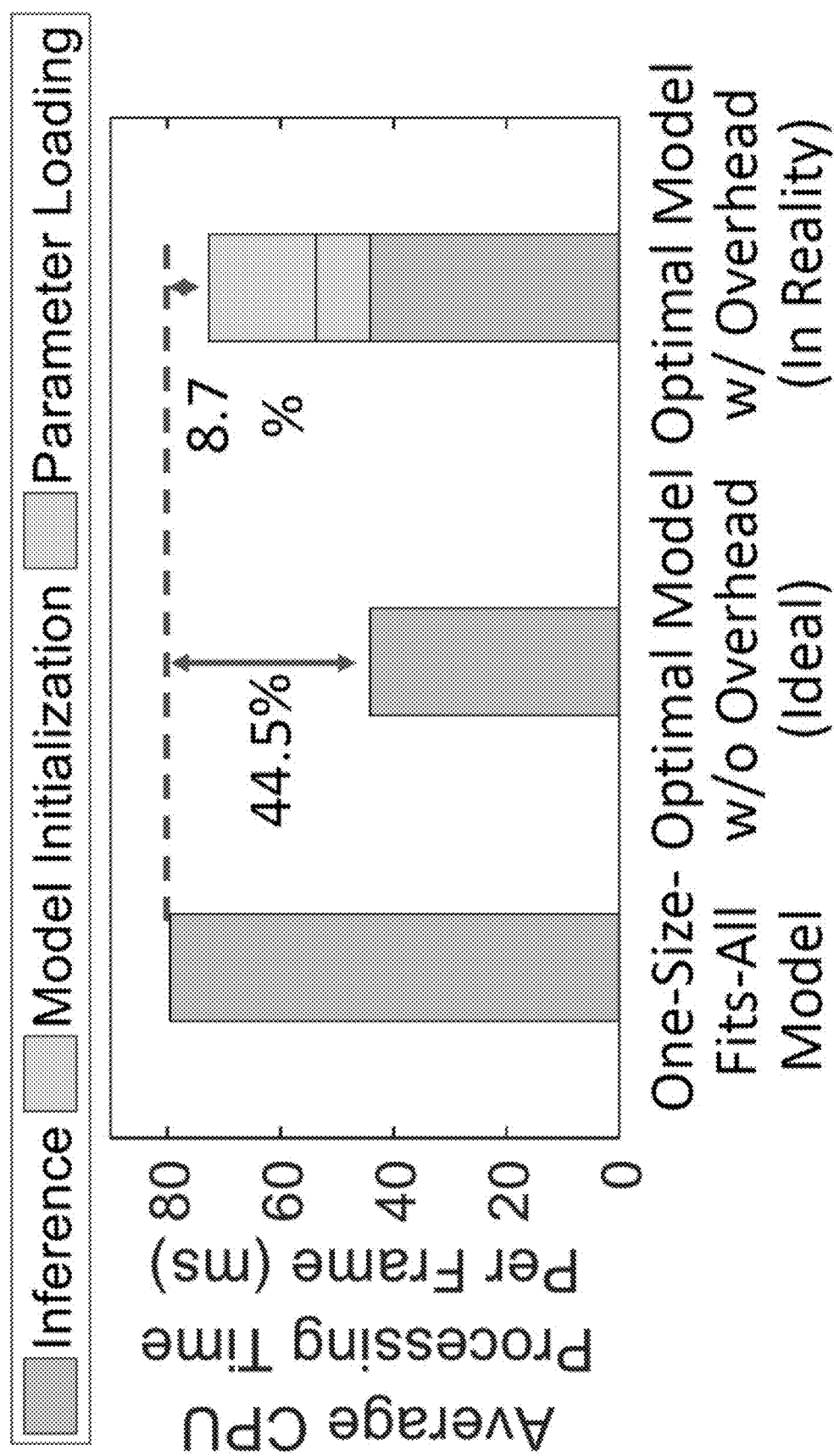
FIG. 2(b) shows example processing time for various model approaches.

Referring to FIG. 2, FIG. 2(a) shows an example of minimum computational consumption required to correctly recognize the content in each frame of a video stream input for different approaches. As shown in the blue solid curve 200, the minimum computation consumed to correctly recognize the content in each frame could changes frequently across frames. This observation reflects the intrinsic dynamics of video contents illustrated in FIG. 1. In addition, the difference between "areas" under the two curves reflects the benefit brought by each of the models. As shown, the large differences indicate that considerable computational consumption can be reduced by matching the capacity of the model to the difficulty level of each video frame. FIG. 2(*b*) shows processing time for various models, and more specifically, benefits brought by the adaptation vs. model switching overhead of the dynamic configuration approach. FIG. 2(*c*) shows exhibition of filter redundancy within each of the 12 convolutional layers of MobileNetV1 (no frames were early exited from L1). Yellow bars (coarse-grained) depict the total number of filters within each layer.

Various techniques and examples are disclosed herein for implementing input-adaptive frameworks that allow for computation-efficient DNNs that adapt based on features of the input they are processing (e.g., based on the complexity of frames of a video stream). These techniques can be implemented to modify neural network models, resulting in implementations and solutions that effectively address the drawbacks of prior attempts to run DNN-based mobile video stream analytics on resource-constrained systems. Several novel aspects of these implementations help bring about the gain in computational efficiency over prior approaches.

To address the limitations of previous approaches (which utilized a "coarse-grained" or "bag of model" approach), a "fine-grained" design can be used to make early predictions at the granularity of filters. Systems that are designed using this approach may incorporate one or more of several different methods for tailoring where and when to use early exit points. These methods can be thought of as part of an early exit architecture search scheme. As one example, a "collective importance-based" filter-ranking scheme to rank the importance of each of the filters within each convolutional layer of a given DNN. This filter ranking can be used to optimize an early exit approach that provides an optimal trade off between computation reduction and preservation of accuracy. Alternatively, the early exit insertion points can be determined by a simple assessment of whether, for each convolutional layer, the computational overhead of making an early exit determination would be outweighed by the computational savings of avoiding subsequent convolutional layers.

The collective importance-based filter ranking can allow for the designs of DNNs to be modified or adapted to give them a more efficient architecture. For example, an optimal architecture for early exits in a DNN could be systematically generated through use of an architecture search scheme, and likewise an optimal early exit insertion plan could be developed through an optimization formulation.

Additionally, such a flexible architecture provides a natural mechanism to optionally address the trade-off between accuracy and resource demand. Using a flexible architecture allows systems to adapt to both workload and system resource dynamics at runtime.

Background Discussion of Neural Networks

First, some general discussion of certain neural network architectures is presented. Convolutional Neural Networks (CNNs) are a type of DNN that can be used for image analysis, video analysis, language analysis, as well as analyses of other input data sets for which the functionality of a CNN would be useful. CNNs can be structured so as to be similar to other neural networks in that they are made up of neurons that have learnable weights and biases. Further, each neuron in such a CNN receives inputs, systematically modifies those inputs, and creates outputs. And like traditional neural networks, CNNs have a loss function, which may be implemented on the last layer.

A CNN can take an input image, assign importance (learnable weights and biases) to various aspects/objects in the image and be able to differentiate those aspects from each other. One advantage of a CNN is that the amount of pre-processing required in a CNN is much lower as compared to other classification algorithms. Some of the reasons that CNN architecture can perform relatively well on an image dataset is due to the reduction in the number of parameters involved and reusability of weights.

The composition of a CNN may include multiple hidden layers that can include convolutional layers, activation layers, pooling layers, fully connected (classification) layers and/or normalization layers. The layers of a CNN may also be thought of as falling into three major groups: Input layers, Feature-extraction (learning) layers, and Classification/regression layers.

The input layer may accept multi-dimensional inputs, where the spatial dimensions are represented by the size (width×height) of the image and a depth dimension is represented by the color channels (generally 3 for RGB color channels or 1 for grayscale). Input layers load and store the raw input data of the image for processing in the network. This input data specifies the width, height, and number of channels.

The feature-extraction layers may include different types of layers in a repeating pattern. An example of such a pattern may be: 1) Convolution layer, 2) Activation layer, and 3) Pooling layer. The feature extraction portion of some CNNs may include multiple repetitions of this pattern and/or other patterns of related layers. An example of CNN architecture stacks sets of convolutional, activation and pooling layers (in that order, or a modified order), repeating this pattern until the image has been merged spatially to a small size. One purpose of feature-extraction layers could is to find a number of features in the images and progressively construct higher-order features. These layers may extract the useful features from the images, introduce non-linearity in the network and reduce feature dimension while aiming to make the features somewhat equivariant to scale and translation.

Depending on the complexities in the images, the number of such layers may be increased for capturing other details even further, but at the cost of more computational power. At some point, a transition may be made to classification layers.

The classification layers may be one or more fully connected layers that take the higher-order features output from the feature-extraction layers and classify the input image into various classes based on the training. The last fully-connected layer holds the output, such as the class scores The convolutional layer is a building block of a CNN. Convolutional layers apply a convolution operation to the input data and pass the result to the next layer. The objective of the convolution operation is to extract features from the input image. A CNN need not be limited to only one convolutional layer. In some embodiments, the first convolutional layer is responsible for capturing the low-level features such as edges, color, gradient orientation, etc. With added layers, the architecture adapts to higher-level features, resulting in a network which has a more complete understanding of images in a dataset.

A convolution operation slides one function or "filter" on top of a dataset (or another function), then multiplies and adds the results together. One application of this operation is in image processing. In this case, the image serves as a two-dimensional filter that is convolved with a very small, local function called a "kernel." During the forward pass, each filter is convolved across the width and height of the input volume, computing the dot product between the entries of the filter and the input, which may output a 2-dimensional activation map of that filter.

The spatial dimensions of the output volume depends on several hyper-parameters, parameters that can be manually assigned for the network. Specifically, the dimensions of the output volume depend on: the input volume size (W), the kernel field size of the convolutional layer neurons (K), the stride with which they are applied (S), and the amount of zero padding (P) used on the border. The formula for calculating how many neurons "fit" in a convolutional layer for a given input size is described by the formula:

$$(W-K+2P)/S+1. \quad \text{(Equation 1)}$$

Stride controls how depth columns around the spatial dimensions (width and height) are allocated. When the stride is 1, the filter slides one pixel per move. This leads to more heavily overlapping receptive fields between the columns, and also to larger output volumes. When stride length is increased the amount of overlap of the receptive fields is reduced and the resulting output volume has smaller spatial dimensions. When the stride is 2, the filters slides 2 pixels per move. Similarly, for any integer S>0 a stride of S causes the filter to be translated by S units per move. In practice, stride lengths of S≥3 are rare.

Sometimes it is convenient to pad the edges of the input with zeros, referred to as "zero padding". Zero padding helps to preserve the size of the input image. If a single zero padding is added, a single stride filter movement would retain the size of the original image. In some cases, more than 1 pad of zeros may be added to the edges of the input image. This provides control of the spatial size of the output. In particular, sometimes it is desirable to exactly preserve the spatial size of the input volume. However, not all inputs are padded. Layers that do not pad inputs at all are said to use "valid padding". Valid padding can result in a reduction in the height and width dimensions of the output, as compared to the input.

The spatial arrangement hyper-parameters of a convolutional layer have mutual constraints. In order for a convolution operation to function the set of hyper-parameters that it uses must combine to allow an integer as the number of neurons required for that layer. For example, when the input has size W=10, no zero-padding is used (P=0), and the filter size is F=3, then it would be impossible to use stride S=2, as shown by an application of the formula:

$$(W-K+2P)/S+1 \rightarrow (10-3+0)/2+1 \rightarrow 4.5. \quad \text{(Equation.2)}$$

As 4.5 is not an integer, the formula indicates that using this set of hyper-parameters will not allow the neurons to "fit" neatly and symmetrically across the input. Therefore, in certain embodiments, this set of hyper-parameters could be considered to be invalid.

In the case of images with multiple channels (e.g. RGB), the kernel can be set to have the same depth as that of the input image. Matrix multiplication is performed between kernel and the input stack ([K1, I1]; [K2, I2]; [K3, I3]) and all the results are summed with the bias, producing a one-depth channel output feature map. Stacking the activation maps for all filters along the depth dimension forms the full output volume of the convolution layer. Every entry in the output volume can thus also be interpreted as an output of a neuron that looks at a small region in the input and shares parameters with neurons in the same activation map.

Most CNNs utilize concepts that are often referred to as "local connectivity" and "parameter sharing" to reduce the potentially immense number of parameters that are traditionally involved in dealing with high-dimensional inputs such as images.

When dealing with high-dimensional inputs, it may be impractical to connect neurons in one layer to all neurons in the previous layer/input. A very high number of neurons would be necessary, even in a shallow architecture, due to the very large input sizes associated with images, where each pixel is a relevant variable. For instance, using a fully connected layer for a (relatively small) image of size 100×100×3 results in 30,000 weights for each neuron in the first layer. This complexity further compounds with the addition of further traditional (fully connected) layers.

Most CNNs connect each neuron to only a local region of the input, so each neuron only receives input from a small local group of the pixels. The size of these local groups is a hyper-parameter, which may be referred to as the "receptive field" of the neuron. Receptive field is equivalent with filter size. The extent of the connectivity along the depth axis is always equal to the depth of the input volume. For example, suppose that an input has size 100×100×3. If the receptive field (or the filter size) is 5×5, then each neuron in the convolutional layer will connect to a 5×5×3 region in the input, for a total of 5*5*3=75 weights (and +1 bias parameter), instead of the 30,000 weights each neuron would have in a traditionally fully connected layer for an input image of size 100×100×3.

In additional to limiting the number of parameters through local connectivity, the convolution operation reduces the number of parameters that need to be calculated through a principle called parameter sharing. Parameter sharing allows a CNN to be deeper with fewer parameters. In its most simple form, parameter sharing is just the sharing of the same weights by all neurons in a particular layer. For example, if there are 100*100*3=30,000 neurons in a first convolutional layer (the number required in a traditional fully connected layer for an input image of size 100×100 RBG), and each has 5*5*3=75 different weights and 1 bias parameter then there are 30000*76=2,280,000 parameters on the first layer alone. Depending on the context, this number could be very high.

Parameter sharing allows the number of parameters to be dramatically reduced by making one reasonable assumption: if one feature is useful to compute at some spatial position (x, y), then it is useful to compute at a different position (x2, y2). In practice this means that a convolutional layer that uses tiling regions of size 5×5 only requires 25 learnable parameters (+1 bias parameter) for each neuron, regardless of image size, because each 5×5 tile (or filter) uses the same weights as all the other tiles. This makes sense as the parameter sharing assumption dictates that if it is useful to calculate a set if parameters (a filter) at one input location then it is useful to calculate that same set of parameters at all input locations. In this way, it resolves the vanishing or exploding gradients problem in training traditional multi-layer neural networks with many layers by using backpropagation. If all neurons in a single depth slice are using the same weight vector, then the forward pass of the convolutional layer can in each depth slice be computed as a convolution of the neuron's weights with the input volume.

There are situations where this parameter sharing assumption may not make sense. In particular, when the inputs to a convolutional layer have some specific centered structure, where one may expect that completely different features should be learned on one side of the image as opposed to the other. One practical example is when the inputs are faces that have been centered in an image. One might expect that different eye-specific or hair-specific features could (and should) be learned in different spatial locations. In that case, the parameter sharing scheme may be relaxed.

Activation layers take an input, which may be the output of a convolutional layer, and transform it via a nonlinear activation function. Generally speaking, activation functions are nonlinear functions that determine whether a neuron should be activated or not, which may determine whether the information that the neuron is receiving is relevant for the given information or should it be ignored. In some cases, an activation function may allow outside connections to consider "how activated" a neuron may be. Without an activation function the weights and bias would simply do a linear transformation, such as linear regression. A neural network without an activation function is essentially just a linear regression model. A linear equation is simple to solve but is limited in its capacity to solve complex problems. The activation function does the non-linear transformation to the input that helps allow the CNN to learn and perform more complex tasks.

The result of the activation layer is an output with the same dimensions as the input layer. Some activation functions may threshold negative data at 0, so all output data is positive. Some applicable activation functions include ReLU, sigmoid, and tanh. In practice, ReLU has been found to perform the best in most situations, and therefore has become the most popularly used activation function.

ReLU stands for Rectified Linear Unit and is a non-linear operation. Its output is given by: Output=Max(0, Input). ReLU is an element wise operation (applied per pixel) and replaces all negative pixel values in the feature map by zero. The purpose of ReLU is to introduce non-linearity in a CNN, since most of the real-world data a CNN will need to learn is non-linear.

In some embodiments, a pooling layer may be inserted between successive convolutional layers in a CNN. The pooling layer operates independently on every depth slice of the input and resizes it spatially. The function of a pooling layer is to progressively reduce the spatial size of the representation, which reduces the amount of parameters and computational power required to process the data through the network and to also control overfitting. Some pooling layers are useful for extracting dominant features.

Pooling units can perform variety of pooling functions, including max pooling, average pooling, and L2-norm pooling. Max pooling returns the maximum value from the portion of the image covered by the kernel. Average pooling returns the average of all the values from the portion of the image covered by the kernel. In practice, average pooling was often used historically but has recently fallen out of favor compared to the max pooling operation, which has been shown to work better for most situations.

An exemplary pooling setting is max pooling with 2×2 receptive fields and with a stride of 2. This discards exactly 75% of the activations in an input volume, due to downsampling by 2 in both width and height. Another example is to use 3×3 receptive fields with a stride of 2. Receptive field sizes for max pooling that are larger than 3 may be uncommon because the loss of activations is too large and may lead to worse performance.

The final layers in a CNN may be fully connected layers. Fully connected layers are similar to the layers used in a traditional feedforward multi-layer perceptron. Neurons in a fully connected layer have connections to all activations in the previous layer. Their activations can hence be computed with a matrix multiplication followed by a bias offset.

The purpose of a fully connected layer is to generate an output equal to the number of classes into which an input can be classified. The dimensions of the output volume of a fully connected layer are [1×1×N], where N is the number of output classes that the CNN is evaluating. It is difficult to reach that number with just the convolution layers. The output layer includes a loss function like categorical cross-entropy, to compute the error in prediction. Once the forward pass is complete, backpropagation may begin to update the weight and biases for error and loss reduction.

Some CNNs may include additional types of layers not discussed above or variations on layers discussed above. Some CNNs may combine more than one type of layer or function discussed above into a single layer. As CNNs are trained, some of the filters within each layer will have increasing ability to influence the predictive output of the CNN. As discussed below, utilizing various techniques, the number of layers and/or number of filters (and hence the computational drain) of a CNN can be adaptively reduced based upon the complexity of the input data set.

Collective Importance-Based Filter Ranking

The inventors have observed that not all the filters within each convolutional layer are necessary for early prediction. Based on this recognition, it is possible to optionally rank filters based on their importance and identify less important filters within each layer. This ranking of filters can assist in multiple types of optimizations of the model. As discussed below, this step of filter ranking is optional, and an alternative or companion to choosing early exit insertion points using other early exit architecture search schemes.

To rank the importance of filters of a particular layer within a DNN in a way that is useful for creating an input-adaptive, flexible and efficient DNN, an improved ranking approach may be used. Existing work ranks each filter within a convolutional layer independently based on a predetermined importance indicator. In these approaches, an L2-norm function is used as the indicator of importance, based on the heuristic that important filters tend to have larger L2-norm values. Unfortunately, this approach has a key drawback: it ignores the dependence between filters in each layer. As a result, information contained in the top-ranked filters can be highly over-lapped. In this regime, a high degree of redundancy could therefore exist among the top-ranked filters, and some comparatively important filters might be lower ranked simply because they had a lower L2-norm value. A more effective ranking approach is therefore needed, in order to permit flexibility and content-drive adaptations in a DNN.

Instead of using the L2-norm-based "rule of thumb" approach, a new scheme (or set of approaches) to filter importance ranking are disclosed. Not only is this new scheme more refined than a simple heuristic, it ranks importance in a more collective, rather than individual way. This scheme takes filter dependence into account to rank the collective importance instead of individual importance of filters within each layer. At a high level, the scheme starts with all filters, and iteratively removes the filter that least reduces the inference accuracy from the filter set.

In one embodiment, the scheme might maintain two lists: ranked and unranked, with ranked initialized as being empty and unranked initiated with the full set of filters included in a convolutional layer. Each filter fi in unranked can be temporarily "dropped" or removed from unranked, an early exit can be added with the feature maps generated by the remaining filters inside unranked as its input, and the parameters of the early exit can be fine-tuned. Next, the validation accuracy of this early exit is obtained and stored in a table "acc" as a key-value pair with the key being fi and the value being the validation accuracy. The dropped filter fi is then added back to unranked. This procedure iterates until all the filters are gone through. Finally, the filter that corresponds to the highest accuracy in the "acc" is identified, is permanently dropped from unranked, and is inserted at the top of ranked. This process can repeat any number of iterations. In one embodiment, the process iterates until the number of filters remaining in unranked is reduced to ⅕ of the original number of filters in the given layer. This is because, in many instances the inventors have found that the feature map extracted by less than ⅕ filters is not sufficient for an early exit to make an early prediction with high-enough confidence. However, in other embodiments there might be applications where it is sufficient to iterate to only ½ or some other fraction of the original number of filters, or it may be useful to iterate through a higher number of filters (e.g., until only ¹⁄₁₀ or ¹⁄₁₀₀ of the filters remain).

In embodiments where some fraction of filters remaining in the unranked list, one approach is to treat each of those remaining filters as being equally important. In other approaches, a more simplistic approach (e.g., heuristically using L2-norm or some other characteristic) can be used to roughly rank the remaining filters. All of these remaining filters, however they are given importance values, can be moved from unranked to the top of ranked.

Based on the now-ranked filters inside ranked, the minimum number of filters can be determined that an early exit needs to achieve the same or substantially the same accuracy as using all the filters within the layer. This can be achieved by iteratively dropping the lowest ranked filters in ranked, running an early exit confidence determination, and repeating until the accuracy of the early exit starts to drop by an undesirable amount. In one embodiment, this can be a predetermined threshold. In other embodiments, this can be a dynamic value determined by a user preference for efficiency/accuracy trade off.

Figure 2C:
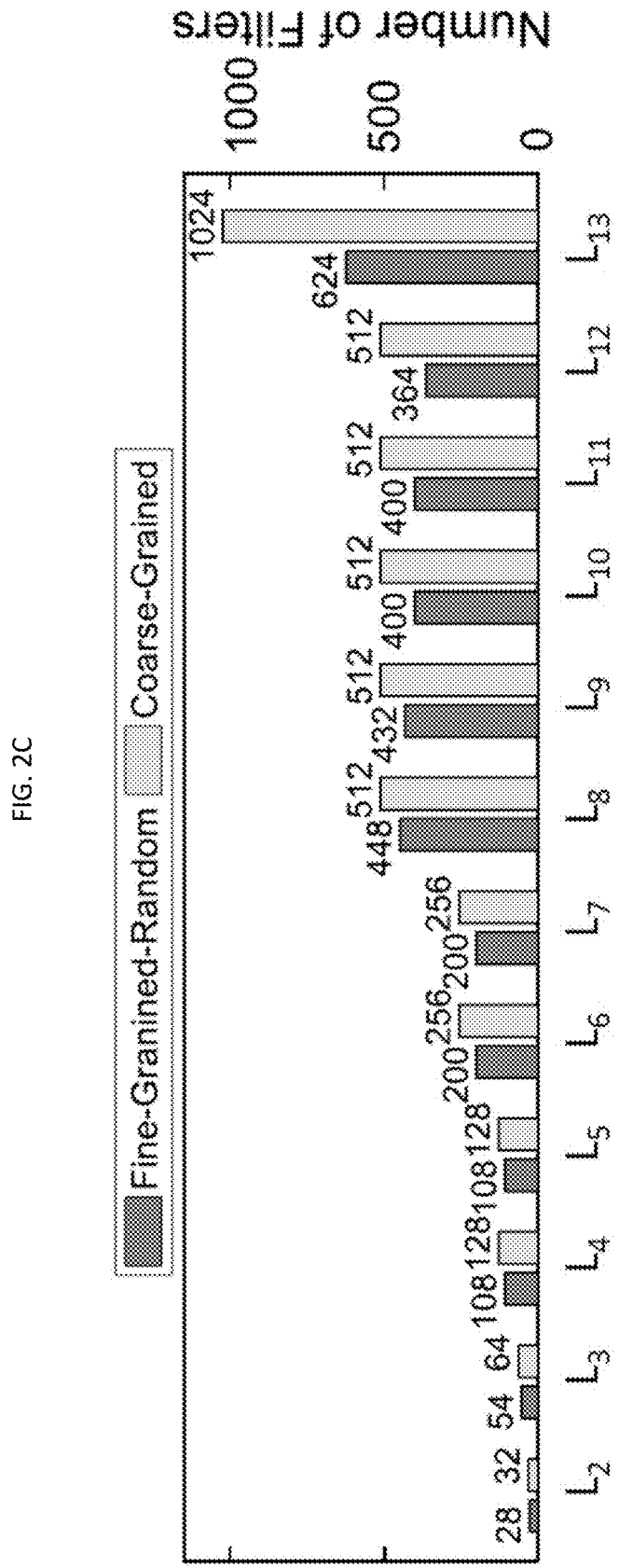
FIG. 2(c) shows exhibition of filter redundancy within convolutional layers of MobileNetV1.
Figure 3:
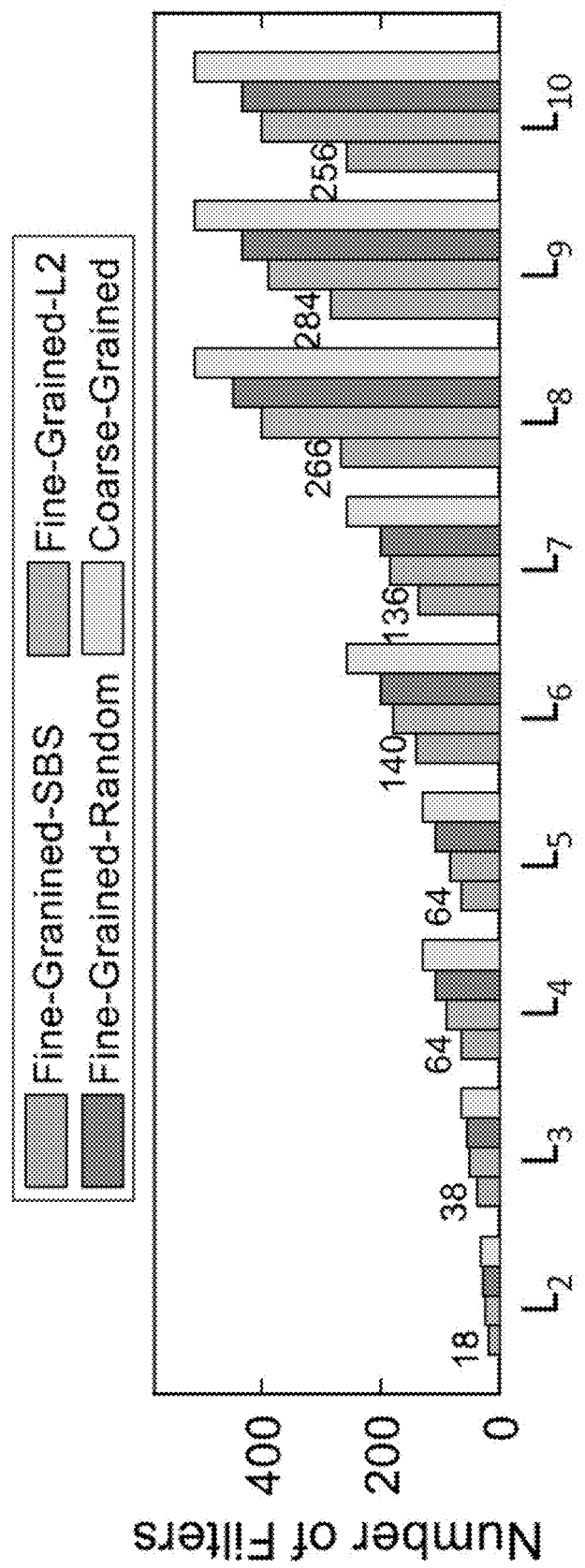
FIG. 3 shows a comparison of results of using a "collective" filter ranking approach versus an "independent" filter.

Referring now to FIG. 3 as well as FIG. 2, a comparison of results of using the above "collective" filter ranking approach versus a more typical "independent" filter ranking scheme based on L2-Norm approach is illustrated. The two schemes were compared using UCF-15 as a video dataset and MobileNetV1 as the base DNN model. The minimum number of filters to achieve the same accuracy as using all filters was determined for each layer of the MobileNetV1 model, separately based on both the "collective" scheme (labeled "Fine-Grained-SBS" in FIG. 3) and the "independent" filter importance ranking scheme based on L-Norm (labeled "Fine-Grained-L2" in FIG. 3).

For reference purposes, the results in FIG. 2(c) are shown alongside the comparison in FIG. 3. The results of L11 to L13 are not shown, since they have similar results as L10. As shown, the minimum number of filters obtained by the collective importance-based filter ranking scheme is lower than the L2-Norm across all layers. In particular, the collective scheme is able to identify up to 28.1% more redundant filters compared to L2-Norm. This is because the collective-importance scheme accounts for the dependence between filters in each layer and thus only selects filters that contain complementary information.

Automatic Optimization of Early Exit Architecture (Architecture Search)

An "early exit" is a way for neural networks to reduce their computational burden. In some embodiments, early exits represent a way for a neural network to stop computations at a certain layer if further computation is believed to be unnecessary for achieving a desired confidence level of the output of the model. As discussed above, this can even be done at a filter level within a layer. Early exists can be thought of in one sense as something akin to a self-contained neural network that can make early predictions.

However, designing the architecture of early exits (including when/where they could exist within a DNN, and how they are triggered) is a non-trivial task, since early exits consume computation. Some computation is required to determine whether the processing of a given input by a DNN is ready to exit. Depending on the architecture of the early exit scheme, this computation can be quite appreciable. And, if it is determined that the DNN is not ready to exit, all of the computation consumed to make that determination simply adds to the overall computational burden of using the DNN. And, as a result, the more early exit determinations that are inserted into a DNN, the more potential for added computation. On the other hand, it is desirable to have early exit decision points inserted as early and often as possible, so that a DNN can exit and stop processing further layers as soon as the accuracy threshold is reached. It can be seen that these two factors (reducing computational overhead caused by each potential early exit determination vs. the desire to have many exist points to allow exiting as early as possible) present a tradeoff.

As such, it is recognized that it would be desirable to minimize the overhead cost of an early exit architecture, by using the least number of layers and filters to build each early exit. However, early exits with such extremely lightweight architecture could exit much fewer video frames of a given video stream, which considerably diminishes the benefit of early exits. Therefore, there exists a trade-off between early exit rates and computational overheads in the design space of early exit architecture. Moreover, the locations at which early exit decision points are inserted in a DNN also affect the early exit rates. Locating early exits too early might reduce early exit rates, whereas locating them too late might increase early exit rate so much that it becomes apparent there is a missed opportunity to further reduce layers and overall computation.

Therefore, the inventors have recognized that it would be desirable to design an architecture for each early exit based on its inserted location, which makes the task of early exit architecture design even more complicated. Existing work (such as BranchyNet and MSDNet) designs the architecture of early exits manually, based on heuristics and considerable amounts of trial and error. However, despite the considerable effort, these approaches do not provide detailed design guidelines due to the complexity of this design task. As a result, such prior approaches may not be generalized to other models, meaning two things: (i) that the architecture will only be as good as the insight and expertise of the human developing the architecture; and (ii) all the effort to develop the architecture needs to be repeated for every single DNN. Because existing approaches require developers to have a substantial knowledge of DNN architecture, and to spend considerable efforts on trial and error, these approaches have not seen widespread adoption in practice and even when adopted their efficacy varies tremendously.

Instead of manually designing an early exit architecture for DNNs based on heuristics and trial-and-error, the techniques and methods disclosed herein may, in some embodiments, utilize a scheme based on "architecture search" to automatically find the optimal architecture for each DNN that balances the trade-off between early exit rates and computational overhead for each early exit.

Design of Early Exit Branch

Figure 15:
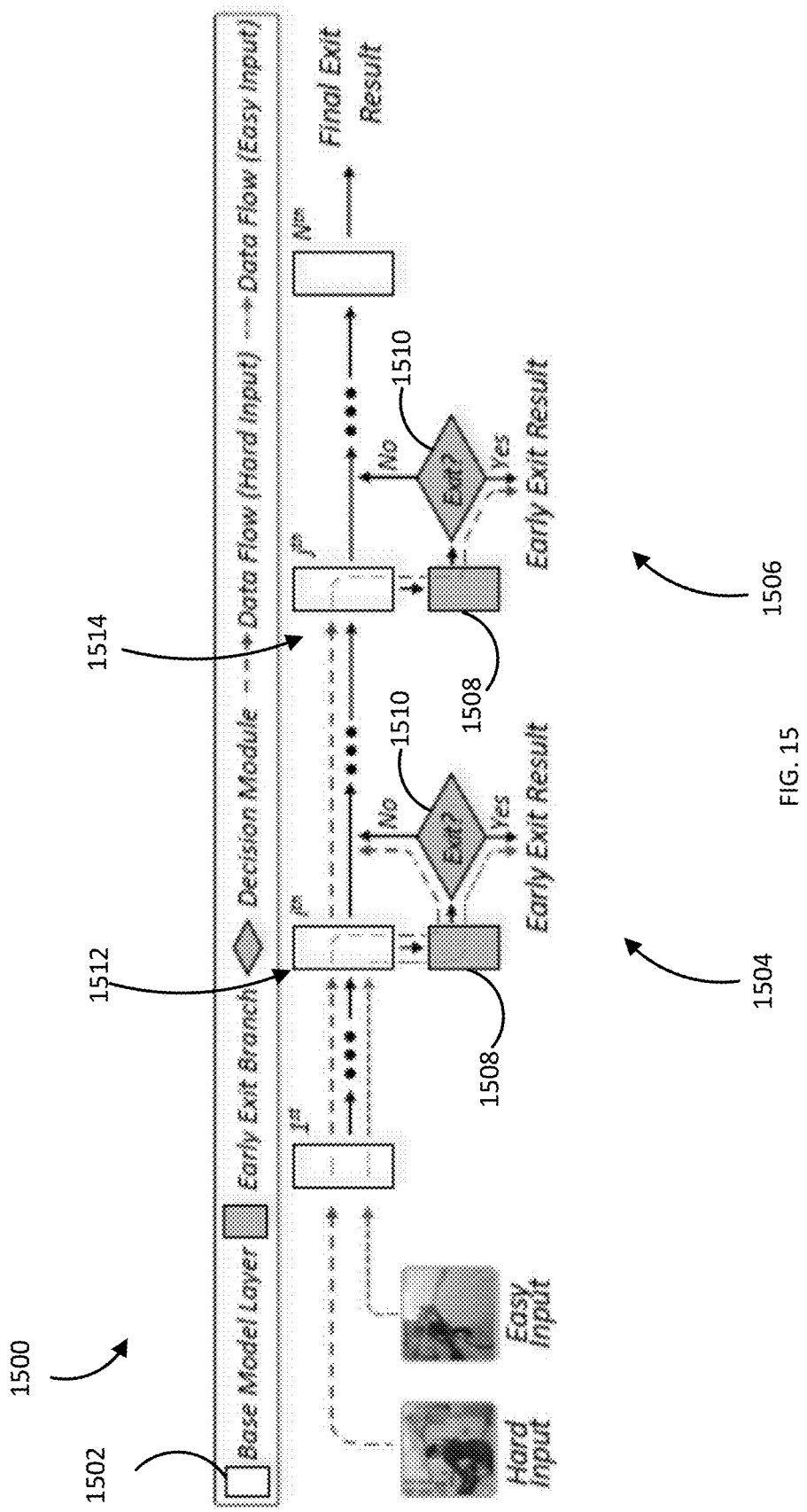
FIG. 15 shows a block diagram of the operation of a input-adaptive DNN.

Referring to FIG. 15, a conceptual illustration of an adaptive and flexible early exit architecture 1500 according to the principles discussed herein is shown. As shown, the improved early exit architecture may be thought of as "built on top" of a base DNN model 1502 with the addition of early exits 1504-1506 inserted at certain locations in the base model. For each early exit 1504-1506, it consists of two components—early exit branch 1508 and decision modules 1510—that are cascaded together. The early exit branch 1508 is essentially a small-size neural network. Like a regular DNN, it may also contain convolutional, activation, pooling, and fully-connected layers, but with smaller sizes as compared to the corresponding "base" layers. In this sense, the smaller early exit branch network merely takes the intermediate features generated by the $j^{th}$ internal convolutional layers 1512-1514 of the base model and transforms them into early predictions. The decision module 1510 then takes the early prediction results generated by the early exit branch 1508 and makes a decision on whether to exit the inference process and output the early prediction results, or to continue the inference process and pass the generated feature maps to the next layer. In this way, a "base" model (which may have already been trained on a training dataset) can be modified to make it flexible and adaptive to the "difficulty" of the input data, without the memory requirements of a "bag of models" approach or the inefficiency of a "coarse" approach.

To optimize such a design in order to achieve the greatest efficiency improvements, the design of an early exit branch balances the trade-off between computational overhead and early exit rate into consideration. Thus, in some embodiments, an early exit architecture could leverage a computation efficient operator as the building block, and employ an architecture search scheme to find the optimal architecture that optimizes the trade-off between early exit rate and computational overhead for each early exit branch.

Among all the types of layers that an early exit branch includes, convolutional layers are the most computation intensive. To reduce the overhead, one approach is to use depthwise separable convolution, a computation-efficient convolution operator to replace the standard convolution as the building block for the design of the early exit branch.

Figure 16:
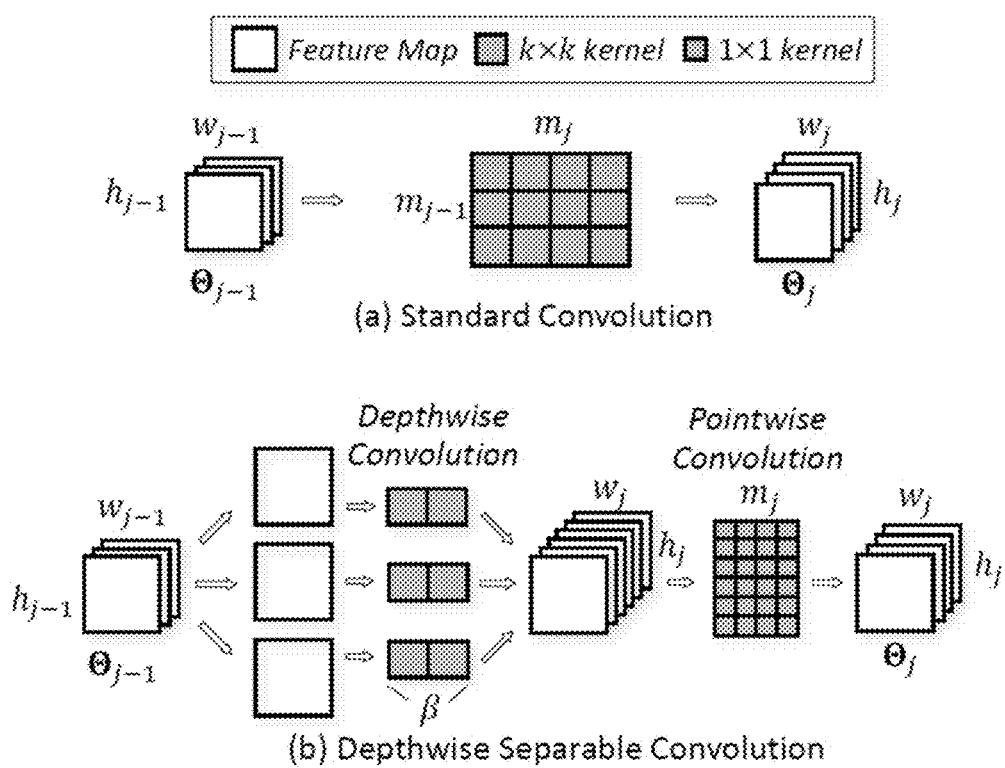
FIG. 16 is a process diagram depicting standard versus depthwise-separable convolution.

FIG. 16 illustrates the structural differences between standard convolutional layers (FIG. 16(a)) and depthwise separable convolutional layer (FIG. 16(b)). Let $\Theta_{j-1} \in \mathbb{R}^{w_{j-1} \times h_{j-1} \times m_{j-1}}$ denote the input and output feature maps for both types of convolutional layers, respectively. For the standard convolutional layer (FIG. 16(a)), it applies $m_j$ 3D filters with size $k \times k \times m_j$ ($k \times k$ is the size of the 2D kernel) onto the input feature maps $\Theta_{j-1}$ generate the output feature maps $\Theta_j$. This process consumes a total of $k^2 w_j h_j m_{j-1} m_j$ floating point operations (FLOPs). In contrast, for the depthwise separable convolutional layer (FIG. 7(b)), it adopts the idea of matrix decomposition, and reduces the computational cost by decomposing the standard convolution into two computationally-cheap consecutive specialized convolutions: 1) depthwise convolution, and 2) pointwise convolution. The depthwise convolution applies a $k \times k \times \beta$ filter on each of the $m_{j-1}$ input feature maps, where $\beta$ is the channel multiplier. The pointwise convolution then applies a $1 \times 1 \times m_j$ filter on each channel of the output of the depthwise convolution to generate $\Theta_1$. Therefore, via the decomposition technique, the computational cost of depthwise separable convolutional layer is reduced to $k^2 \beta w_j h_j m_{j-1} + \beta w_j h_j m_{j-1} m_j$ FLOPs. Thus, the computational overhead of early exit branches can be reduced using the depthwise separable convolutional layer as the building block for the early exit branch.

In general, network architecture search approaches in accordance with the techniques disclosed herein can be grouped into two categories: a) the bottom-up approach that searches for an optimal cell structure based on reinforcement learning (RL) or evolutionary algorithms and "stacks" cells together to form a network; and b) the top-down approach that prunes an over-parameterized network until the optimal network architecture is found. Although both approaches work reasonably well in context-adaptive DNN approaches such as disclosed herein, the top-down approach will be described in greater detail herein.

In one embodiment, to identify the most efficient architecture of early exit branches, each early exit branch (such as shown in FIG. 15) is initialized with three depthwise separable convolutional layers, and one fully-connected layer. During the architecture search process, a depthwise separable convolutional layer is removed if no early exit rate drops at that particular early exit branch. This process can then terminate after the redundant depthwise separable convolutional layers at all the early exit branches are removed.

Design of Training Scheme

The early exit model that is built on top of the base model with the inserted early exit branches can be trained by combining the loss function of the base model with the loss functions of the inserted early exit branches. In one example design, cross entropy can be used as the loss for both the base model and early exit branches, and a loss function can be designed that is the weighted sum of the loss of the base model and the loss of each individual early exit branch:

$$\mathcal{L} = \mathcal{L}_B + \sum_{i=1}^{N} \alpha_i \mathcal{L}_i \qquad \text{(Equation 3)}$$

In the above equation, $\mathcal{L}_B$ is the loss of the base model, $\mathcal{L}_i$ is the loss of the $i^{th}$ early exit branch, N is the number of inserted early exit branches, and $\alpha_i$ is the weight of the $i^{th}$ early exit branch, reflecting its importance within the entire model. Empirically, the inventors have found that setting all $\alpha_i$ to 1 works well. Based on this loss function, the early exit model can be trained using stochastic gradient descent.

Alternative Design of Early Exit Branch and Training

Another, alternative, early exit architecture search scheme starts with inserting an over-parameterized early exit at every possible location in a DNN model. In other words, an over-parameterized early exit is inserted into a DNN model after each convolutional layer. For each layer, we insert M early exits where the $k^{th}$ early exit uses the first [kN/M] most important filters ranked in ranked as input, where N denotes the total number of filters of this layer. We initialize each early exit with four layers with each layer having twice as many filters as its corresponding previous layer. We increase the number of filters by the factor of two so as to properly encode the increasingly richer representations as we go deeper.

Next, in one embodiment the early exit architecture search scheme could proceed to maximize the early exit rate by training with emphasis on important filters followed by minimizing the computational overheads of early exits via iteratively pruning layers and filters. In doing so, the best trade-off between early exit rates and computational overheads of each individual early exit is achieved. Based on how we insert early exits in our previous step, the higher ranking a filter is, the more frequent the filter will be used by early exits. To encourage these frequently used filters to learn more salient features, we train those filters with "emphasis", by assigning them a lower dropout rate compared to filters that are lower ranked. In doing so, this process essentially maximizes early exit rate of each early exit.

Although the exit rate of each early exit has been maximized, the overhead incurred by each overparameterized early exit is significant due to over-parameterization. The techniques disclosed herein can minimize this overhead by pruning layers and filters of each early exit until the exit rate starts to drop. Specifically, for each early exit, we start with layer-wise pruning by iteratively pruning its layer until the exit rate drops. We then apply filter-wise pruning by iteratively pruning lower ranked filters until the exit rate drops. As a result, the architecture of each inserted early exit achieves the optimized trade-off between the exit rate and computational overhead.

Design of Decision Module

Each inserted early exit introduces the possibility that a unit of an input stream (e.g., a video frame, an image, a LIDAR scan, or other data unit) that needed to be processed through all convolutional layers nonetheless exits too early, leading to reduced accuracy. Thus, it can be considered that the early exit rate of a given early exit reflects the probability of a frame to be exited to avoid further computation. To preserve accuracy (e.g., avoiding a "hard" video frame exiting prematurely), the early exit model can incorporate an entropy-based confidence score. In other words, a frame is exited if its entropy-based confidence score is higher than a pre-determined or dynamic threshold. Formally, a confidence score may be defined as:

$$Conf(y) = 1 + \frac{1}{\log C} \sum_{c \in C} y_c \log y_c \quad \text{(Equation 4)}$$

where $y=[y_1; y_2; \ldots y_c; \ldots y_C]$ is the softmax classification probability vector generated by an early exit, C is the total number of classes, and $E_{c \in C} y_c \log y_c$ is the negative entropy of the softmax classification probability distribution over all the classes. The threshold for each early exit at which the running of DNN for a given frame can be exited without loss of accuracy can be obtained using cross validation. We denote those thresholds as:

$$T_{lossless}=(T_{EE_1}, \ldots, T_{EE_i}, \ldots, T_{EE_K}) \quad \text{(Equation 5)}$$

Where EEi denotes the ith early exit of Net, and K is the total number of early exits inserted in Net. In essence, Con f measures the confidence level of the early prediction result generated by the early exit branch. The higher the Con f is, the higher the confidence level is. The decision module, described above, can decide to early exit the input frame if the value of Con f exceeds a predetermined threshold, or exceeds a threshold based upon realtime feedback from a user or from other sensors of the mobile device.

Figure 17:
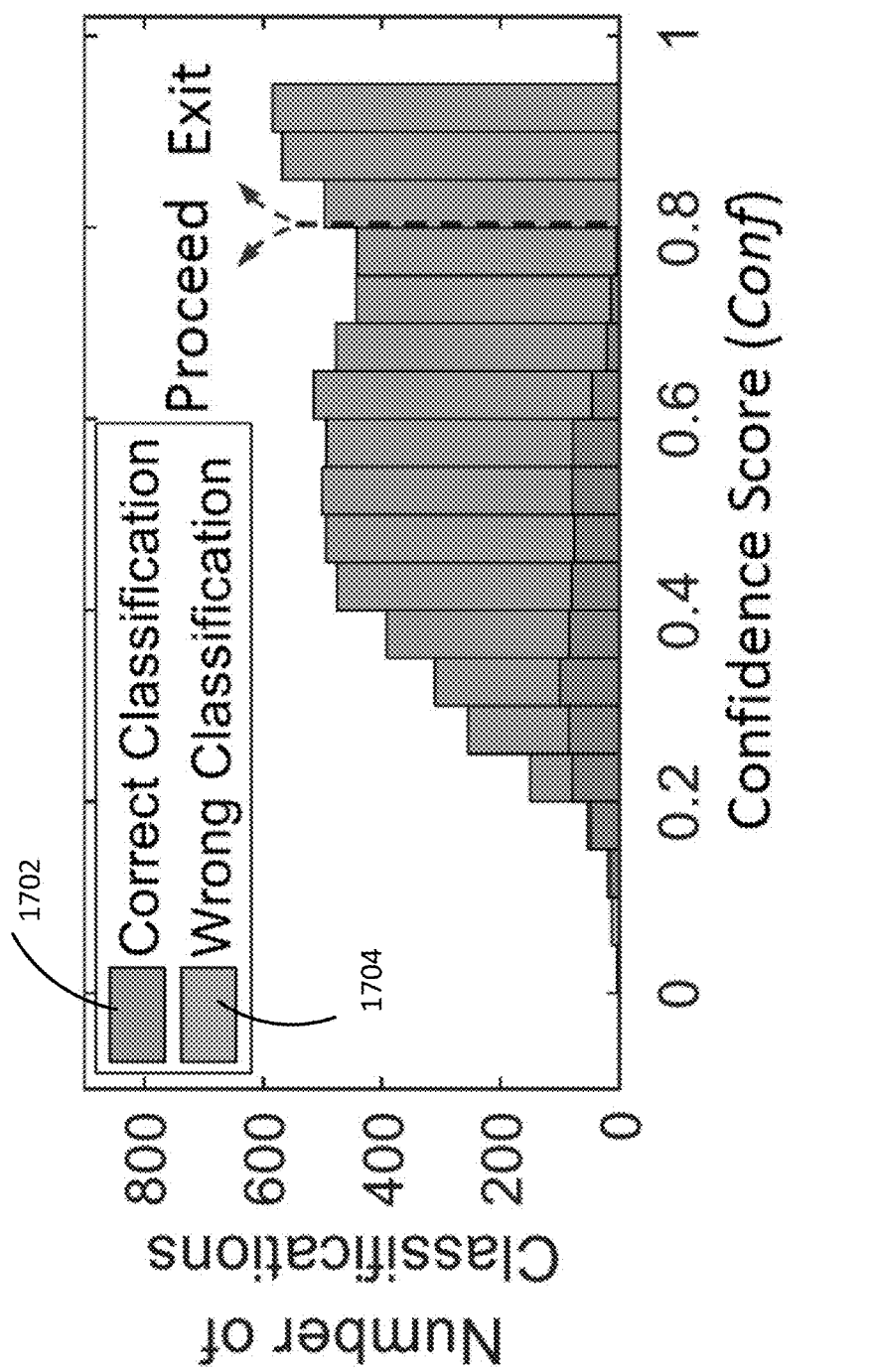
FIG. 17 is a graph illustrating how an early exit confidence threshold can be determined based upon expected accuracy levels.

FIG. 17 illustrates an example of how a predetermined threshold of the confidence score can be set. FIG. 17 is a graph 1700 showing the confidence score distribution of 7,500 early exit prediction results, which are generated by the early exit branch inserted at the first convolutional layer of the VGG-16 based model trained on the UCF-15 dataset (described below). As shown, the confidence score distribution of the correct classification results 1702 overlaps with the confidence score distribution of the incorrect classification results 1704 when the value of Con f is in the range of 0.1 to 0.8. This overlapping range is where "hard" inputs (e.g. video frames, or other sensor inputs such as LIDAR) may exit prematurely. In contrast, when the value of Con f is in the range of 0.8 to 0.95, the distributions of the correct 1702 and incorrect 1704 classification results do not overlap, and only correct classification results reside in this range. This is where the early exit branch can make sufficiently certain classification to early exit the input without sacrificing (or, alternatively minimal reduction of) the original accuracy of the base model. In some embodiments, it may be desirable for a developer to select the confidence score value at the lower bound of the non-overlapping region as the threshold. In other embodiments, where increased accuracy is desirable, or where the real time inputs may not be a close match to the training inputs, higher accuracy may be selected. In further embodiments, the confidence score threshold may be dynamically adjusted during runtime according to factors such as available resources, user feedback of false predictions, or the like.

Although the optimized trade-off between the exit rate and computational overhead of each early exit is achieved by our architecture search scheme explained above, the optimized trade-off of the entire network is not. This is because early exits have been inserted at each possible location throughout the network and hence accumulate immense overhead in the aggregate. It is therefore desirable in many implementations to obtain a more global optimization trade-off for an entire network.

Prior work, including BranchyNet and MSDNet, attempted to manually determine the early exit insertion locations by trial and error. As discussed above, this does not ensure optimal results and requires significant developer time. Therefore, to address these shortcomings and provide an improved scheme, various embodiments disclosed herein can adopt a more systematic approach to deriving an optimal early exit insertion plan. These embodiments can rely on a scheme in which the derivation of the early exit insertion plan is formulated as an optimization problem that is solved by using an efficient greedy heuristic that greedily prunes the "worst" early exit in an iterative manner.

Figure 18:
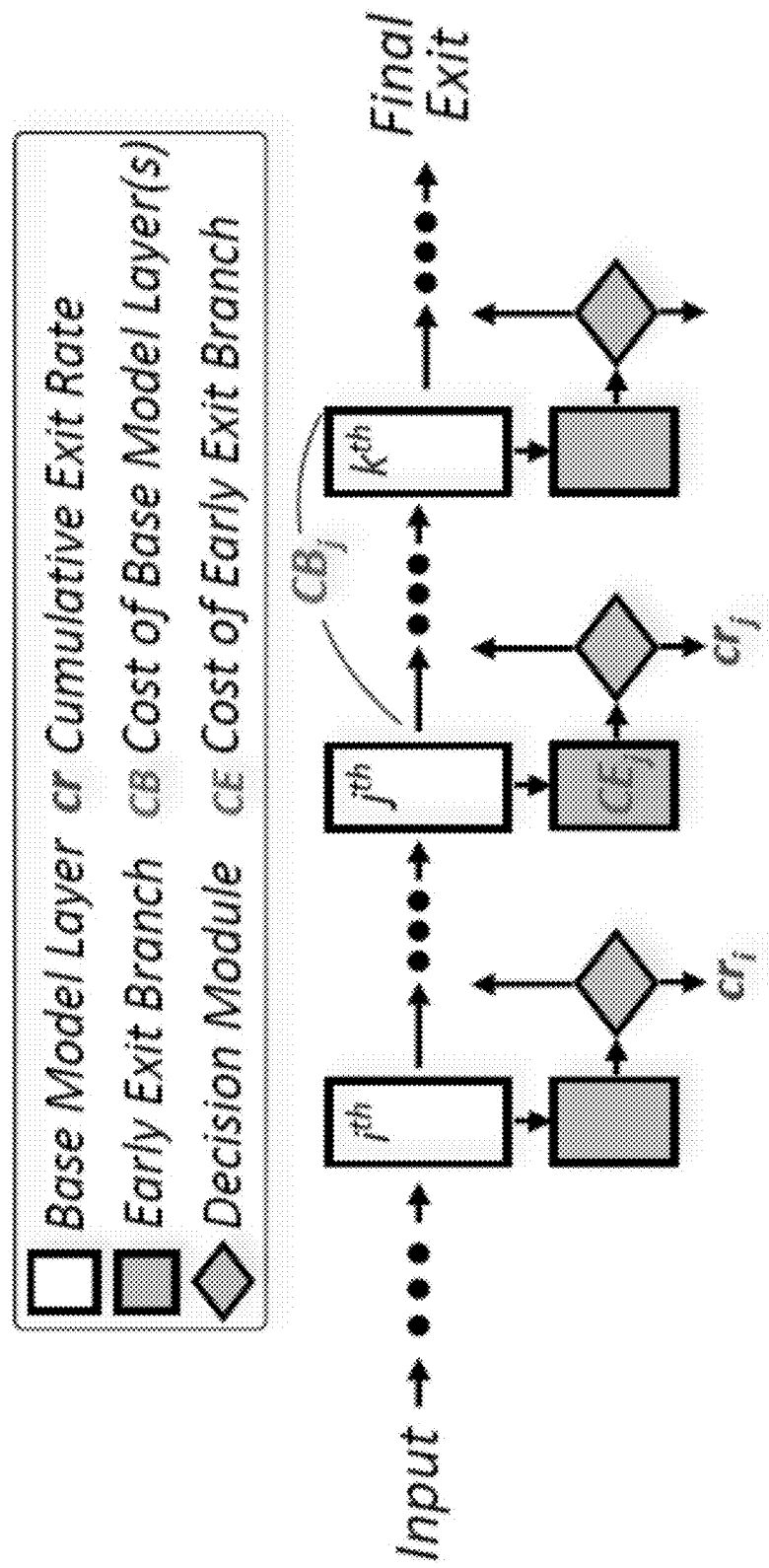
FIG. 18 is a process diagram which illustrates how locations of early exit branches can be optimized.

In one approach, to determine if an early exit should be inserted at a given convolutional layer of the base model, we can define a metric $R_j$, as the ratio between the benefit $G_j$ that the early exit brings and the overhead $C_j$ it incurs:

$$R_j=G_j/C_j \quad \text{(Equation 6)}$$

Where $C_j$ is the computation consumed by the early exit (which may be reduced, as described above, when compared to typical neural networks), and $G_j$ is the computation avoided due to the existence of the early exit. Both $C_j$ and $G_j$ are measured by the number of floating point operations. FIG. 18 helps illustrate how $C_j$ and $G_j$ are calculated. The figure depicts three consecutive early exits inserted at the $i_{th}$, $j_{th}$, and $k_{th}$ convolutional layer (i<j<k). Let N denote the total number of units of the input stream (e.g., video frames), $cr_i$ and $cr_j$ denote the cumulative exit rate of the $i_{th}$ and $j_{th}$ early exit, respectively (0<$cr_i$<$cr_j$<1), $CE_j$ denote the computation consumed by the $j_{th}$ early exit per input frame, and $CB_j$ denote the computational cost of the base model between the $j_{th}$ and $k_{th}$ convolutional layer per input video frame. The values of $cr_i$ and $cr_j$ are profiled and determined through cross validation.

Since $N*cr_i$ units of the input stream exit at the $i_{th}$ early exit, there are $N*(1-cr_i)$ units going through the $j_{th}$ early exit. As a result, $C_j$ is calculated as:

$$C_j = N*(1-cr_i)*CE_j \quad \text{(Equation 7)}$$

There are $N*(1-cr_i)$ input frames exiting at the $j_{th}$ early exit. These input frames avoid further computational cost incurred between the $j_{th}$ and $k_{th}$ convolutional layer of the base model. Therefore, $G_j$ is calculated as:

$$G_j = N*(cr_j - cr_i)*CB_j \quad \text{(Equation 8)}$$

Therefore, if $R_j$ (from Equation 6) is larger than 1, it indicates that the benefit of inserting an early exit at the $j_{th}$ convolutional layer is larger than the overhead it incurs. Therefore, we start with a trained DNN model with early exits inserted at every convolutional layer, and then remove early exits whose R values are less than or equal to 1, while maintaining those whose R values are larger than 1. In doing so, we are able to identify the number and locations of the early exists that can fully leverage the benefit brought by the early exit mechanism for that specific trained model.

In one implementation of the techniques disclosed herein, the above process of optimizing the early exit branches and identifying the most optional early exit locations can be done in an automated manner for a developer. For example, the processing power of a remote or cloud server could be utilized to perform the branch optimization and location optimizations discussed above. A user could simply provide a trained model via a user portal (e.g., a website or app), and the server could transfer the trained base model into an input adaptive model. Alternatively, or in combination, user could provide a dataset to be used for training and optimization of a neural network. E.g., a user could select from among several "off the shelf" DNN models, and instruct the server to transform it into an optimized, input-adaptive model based upon a user-identified dataset.

Following another new technique, the derivation of an early exit insertion plan is framed as the following optimization problem:

$$Net^* = \underset{\tilde{Net}}{\operatorname{argmin}} Res(\tilde{Net}) \quad \text{(Equation 9)}$$

where Net* is the model with optimal early exit insertion plan, N~et is the set of candidates with all the possible insertion combinations, and Res( ) evaluates the computational consumption of a specific insertion plan.

However, simply trying to solving Eq. (9) by searching all the possible insertion plans would be computationally expensive because there are 2K combinations, where K is the total number of insertion locations. To reduce the complexity of this process, a greedy heuristic can be used to obtain an approximation solution based on the following considerations.

When a model is densely inserted with early exits, pruning any of the early exits leads to reduction of computational consumption. Among all early exits, pruning the early exit with the smallest early exit rate and the large computational overhead leads to the largest reduction of computational consumption (i.e., inefficient early exit location). Based on this observation, systems utilizing the techniques disclosed herein can greedily prune these inefficient early exits in an iterative manner. This iteration process can be terminated when computational consumption of the model starts to increase. This is because at this stage, all the remaining early exits are contributing to the computational efficiency and hence are beneficial to the model. As such, the remaining early exits represent the optimal early exit insertion plan.

To identify inefficient early exits, a metric Q can be defined that quantifies the quality of the trade-off between early exit rate and computational overhead of a particular early exit. Specifically, for early exit j, we define its quality $Q_j$ as the ratio between the gain $G_j$ it brings and the cost $C_j$ it incurs:

$$Q_j = G_j / C_j \quad \text{(Equation 10)}$$

where $C_j$ is the computation consumed by the early exit, and $G_j$ is the computation avoided due to the existence of the early exit. Both $C_j$ and $G_j$ are measured by the number of floating point operations.

Figure 4:
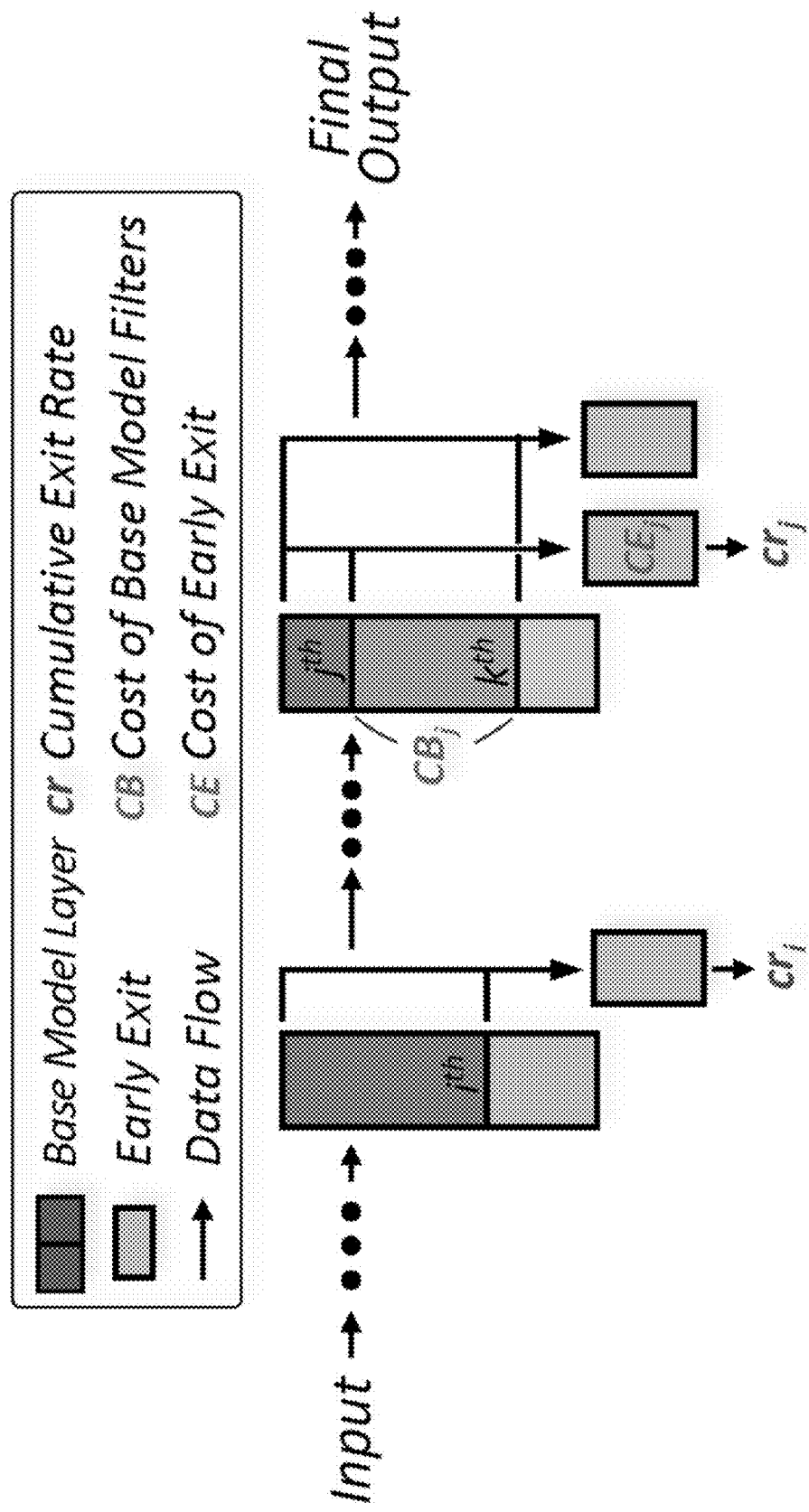
FIG. 4 shows how various parameters are calculated.

FIG. 4 illustrates how $G_j$ and $C_j$ are calculated. In particular, FIG. 4 shows three consecutive early exits inserted at the $i^{th}$, $j^{th}$, and $k^{th}$ early exit positions of base model ($i<j<k$). Let F denote the total number of input frames; $cr_i$ and $cr_j$ denote the cumulative exit rate of the $i^{th}$ and $j^{th}$ early exit, respectively ($0 \le cr_i < cr_j \le 1$); $CE_j$ denotes the computation consumed by the $j^{th}$ early exit per input frame; and $CB_j$ denote the computational cost of the base model between the $j^{th}$ and $k^{th}$ early exit per input video frame. Since $F*cr_i$ input frames exit at the $i^{th}$ early exit, there are $F*(1-cr_i)$ input frames going through the $j^{th}$ early exit. As a result, $C_j$ is calculated as:

$$C_j = F*(1-cr_i)*CE_j \quad \text{(Equation 11)}$$

There are $F*(cr_j - cr_i)$ input frames exiting at the $j^{th}$ early exit. These input frames avoid further computational cost incurred between the $j^{th}$ and $k^{th}$ convolutional layer of the base model. Therefore, $G_j$ is calculated as:

$$G_i = N*(cr_j - cr_i)*CB_j \quad \text{(Equation 12)}$$

Runtime Adaptations

The speed at which the frames of video data from of mobile vision systems must be processed varies based upon a number of factors, including (1) factors based upon the particular video acquisition hardware/software (e.g., frame rate, frame resolution, color vs black and white, etc.), (2) as the context of what is being represented in the video (e.g., rapidly changing scenes or many moving objects vs a comparatively static scene such as a surveillance or security video), and (3) the resource demands of other applications that may be concurrently running on a system while the mobile vision is to be processing video frames. While the specifics of the hardware/software system providing the video data should be taken into account in designing a more efficient DNN, the latter factors—the context of what is being represented in the video and runtime resource availability—are more complex factors to address.

To ensure that systems employing mobile vision and DNNs are obtaining all the necessary information contained in video frames, videos captured by mobile vision systems moving in high speeds require high frame processing rates while videos captured by mobile vision systems moving in low speeds (or stationary) require low frame processing rates. Therefore, the workload of processing videos captured by mobile vision systems can vary greatly in different contexts. In addition, some mobile vision systems might often be running multiple applications concurrently, and hence their available runtime computation resources are dynamic due to events such as starting new applications, closing existing applications, and application priority changes. In addition, the battery status of these systems changes and hence requires different energy budgets. Therefore, the system resources in mobile vision systems can also change dynamically due to multi-tenancy.

To adapt to such workload and system resource dynamics, certain optional implementations of the techniques disclosed herein may use a virtual "knob" to reflect a trade-off between accuracy of mobile vision and its resource demand. Specifically, based upon an accuracy-resource profile that is first generated offline, these systems can dynamically adjust the "knob" to adapt to the current workload and system resource at runtime such that the systems are able to achieve the highest feasible accuracy given the then-present circumstances.

To obtain the accuracy-resource profile, the exit threshold of Net* obtained in Eq. (9) is changed by applying a knob $\alpha \varepsilon(0,1]$ on $T_{lossless}$ (defined in Eq. (13)). Formally, the exit threshold T is given by:

$$T = \alpha T_{lossless} = (\alpha T_{EE_1}, \ldots, \alpha T_{EE_i}, \ldots, \alpha T_{EE_K}) \quad \text{(Equation 13)}$$

In essence, the lower a is, the less T are. With a lower a, a video frame is able to exit earlier and hence consumes less computation.

Figure 5:
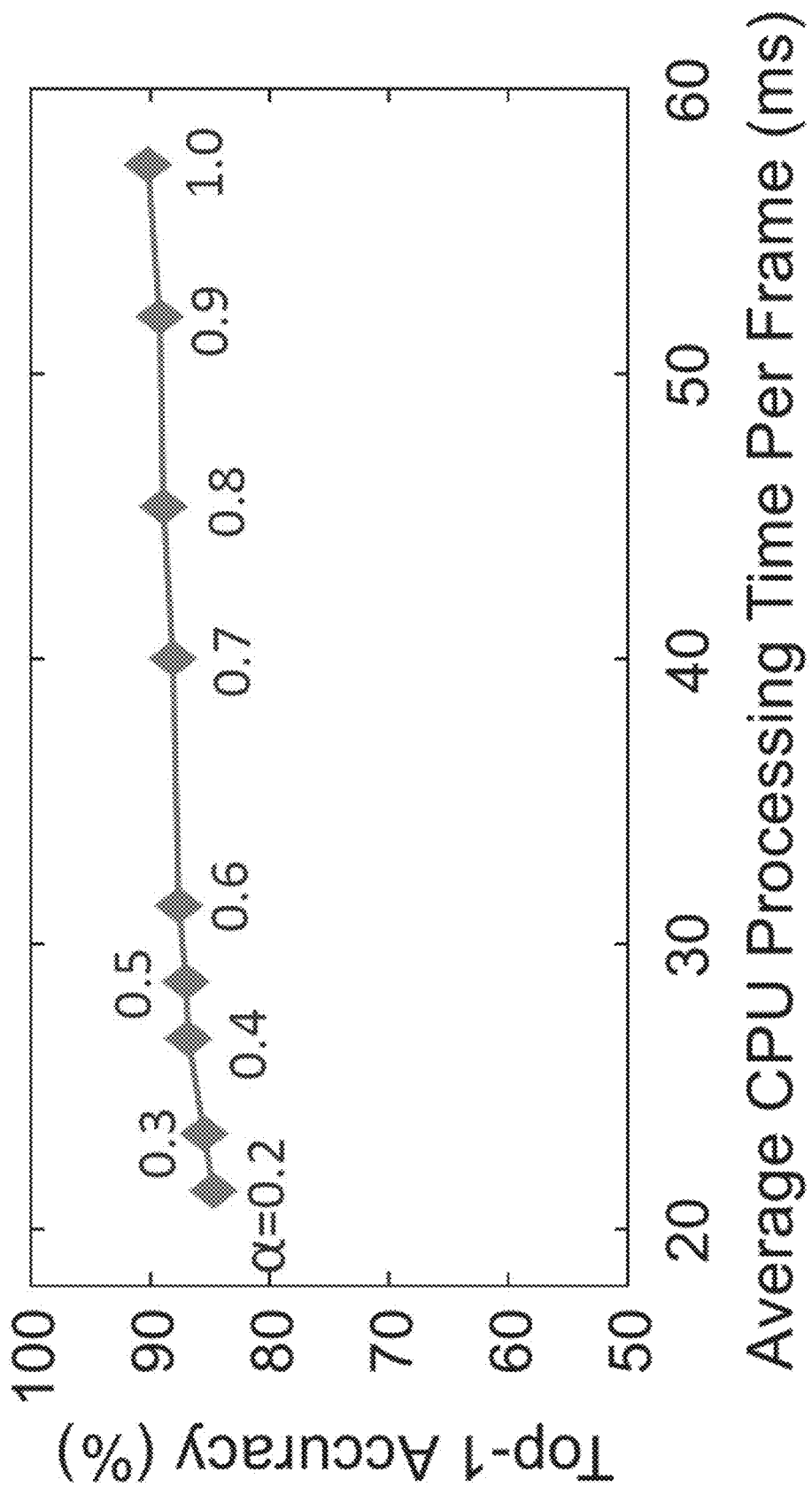
FIG. 5 shows an accuracy-latency profile.

Given T, the accuracy-resource prole is then obtained by offline profiling of the accuracy and the corresponding resource usage on a given mobile platform. As one example, a system might focus on two types of resources: computational resource and energy resource. Computational resource can be evaluated as average CPU/GPU processing latency per video frame, and energy resource can be evaluated as average energy consumption per video frame. Both accuracy-latency and accuracy-energy consumption profiles can be obtained under 100% CPU/GPU utilization. As an example, FIG. 5 shows the accuracy-latency profile with a varying from 0.2 to 1.0. As shown, by changing a to different values, a system utilizing this approach is able to effectively trade off accuracy and frame processing latency. Specifically, such a system is able to reduce 62.8% frame processing latency by only sacrificing 4.9% Top-1 accuracy. The inventors have determined that the accuracy-energy consumption profile exhibits a similar profile.

The goal of runtime adaptation is to find the optimal a value such that a mobile vision system that embodies techniques described herein sacrifices minimal accuracy while still being able to timely process all the frames of a given video stream at the rate they are provided, within the system resource budget. To achieve this goal, such a system can continuously monitor the workload demand of processing the incoming frames of a video stream, and monitor available system resources, and map them into a latency budget and energy budget. Based on the latency and energy budget, the system can dynamically derive the optimal a value as follows.

A processor of the system can receive three inputs: (a) the frame rate of the current workload fr; (b) the ratio of the allocated computational resource at runtime to total computational resources of the mobile system r; and (c) the energy resource budget per frame $Bud_e^{max}$. These inputs can be obtained from other applications running on the processor (e.g., the video data acquisition process might provide the frame rate; other system processes might offer allocated computational and energy resources). Given those three inputs, the processor can be programmed to first calculate the latency budget with 100% CPU/GPU utilization $Bud_t=1/fr$. Next the processor can adapts $Bud_t$ to the allocated computational resource at runtime by dividing $Bud_t$ with r: $Bud_t^{max}=Bud_t/r$. For computing the energy budget, the system directly uses $Bud_e^{max}$. Finally, the optimal a value is obtained by finding the largest a from accuracy-latency and accuracy-energy consumption profiles such that the system runs within both the latency budget $Bud_t^{max}$ and the energy budget $Bud_e^{max}$.

Figure 6A:
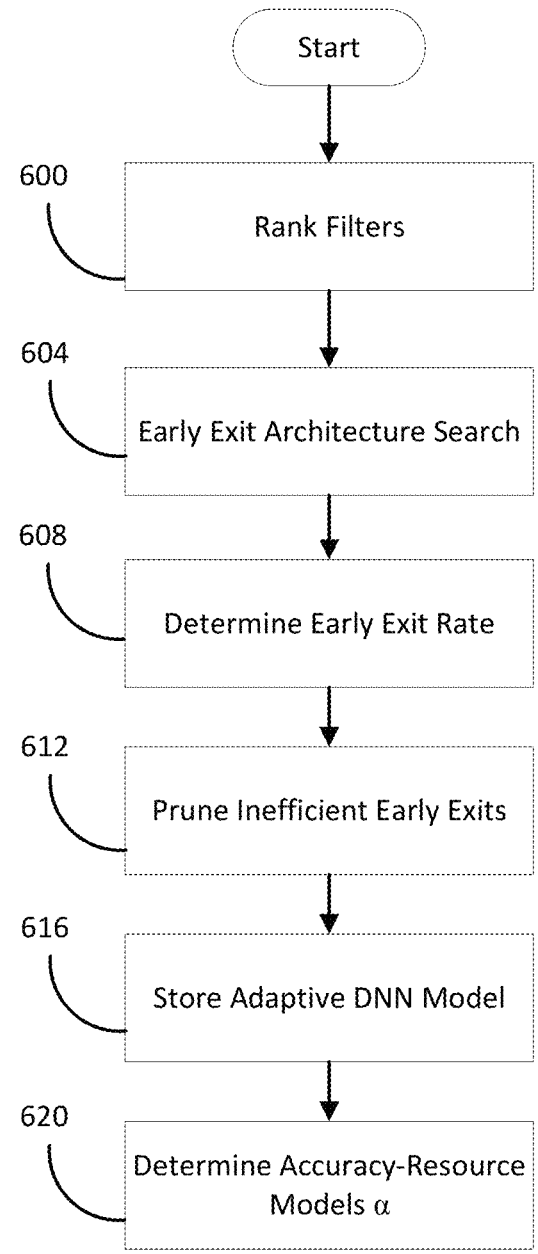
FIG. 6(a) shows a flowchart of a process flow chart for offline actions involved in creating an input-adaptive DNN.
Figure 6B:
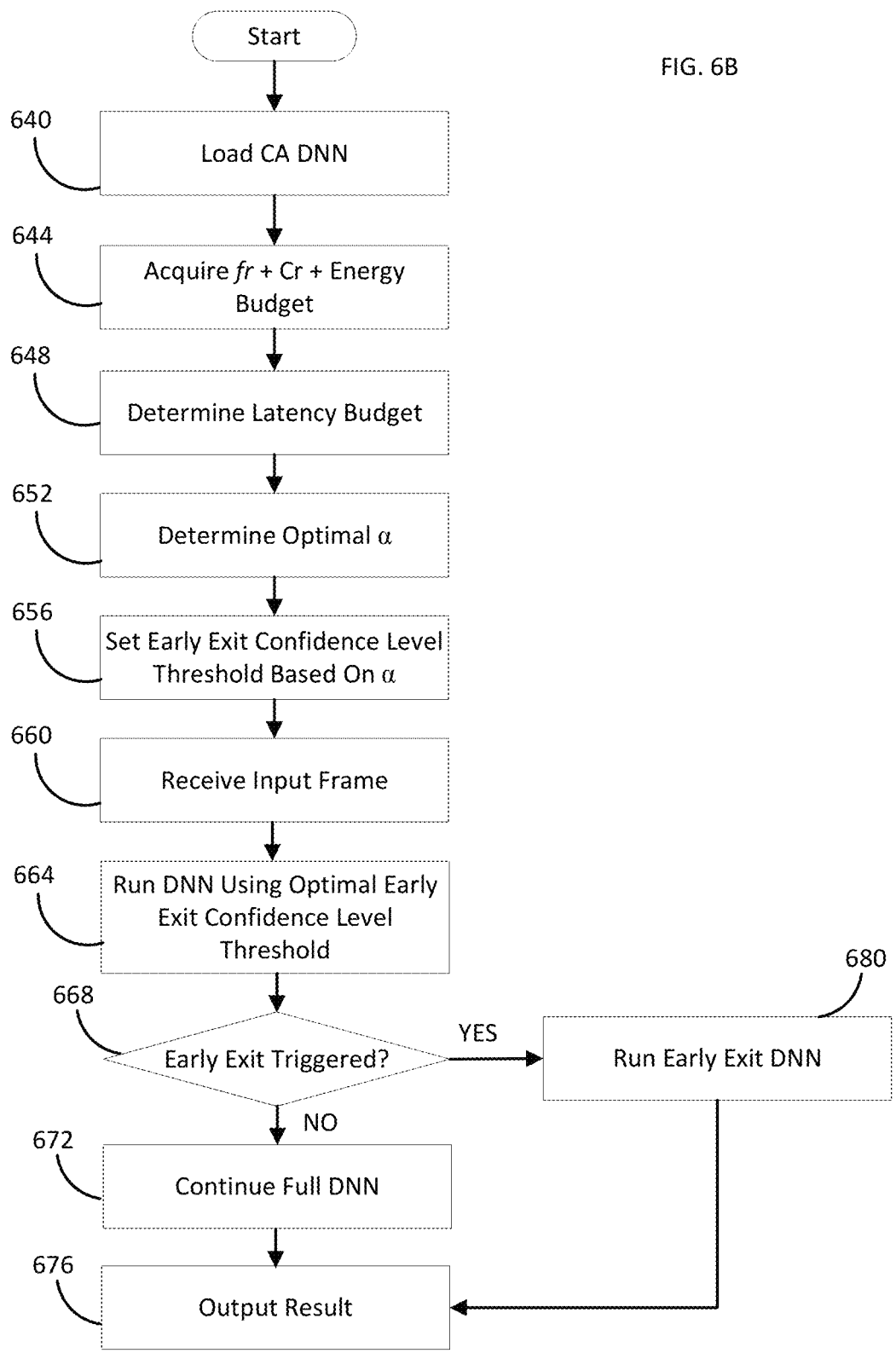
FIG. 6(b) shows a flowchart of a process flow chart for runtime actions involved in creating an input-adaptive DNN.

Turning now to FIG. 6, a pair of flow charts are shown, to illustrate one way in which the offline and runtime aspects of the above techniques interact. FIG. 6(*a*) is a process flow chart for the "offline" or pre-runtime actions involved in creating a input-adaptive DNN. The "offline" process for generating a input-adaptive DNN can be carried out on the mobile device on which the DNN will run, or could be performed on a separate system having greater computational resources (with the generated DNN then loaded on a mobile device that might run the DNN). In either case, a DNN-generating software application is run that automates performance of the DNN generation. In this way, the DNN-generating software application greatly improves on prior approaches, like BranchyNet, which require a software developer to manually set important features like early exit locations.

The processes described above can be run on device(s) other than mobile devices. In particular, the processes can be applied beneficially in any scenarios where the device is resource constrained, such as having finite battery power or having lower computational power than may be required to efficiently perform a given task using DNN's. Or, the processes can simply be used where reduced computation time or other resource demands is desired. The processes may also be used on tasks other than video streams, such as any task that can be completed using a DNN that also involves a large amount of repetitive yet similar information, similar to video frames of a video stream. The processes may also be used in devices where reducing computational latency is of interest, such as in a cloud processing system where a faster result is preferred by an end user.

This flowchart of FIG. 6(*a*) assumes a convolutional model has been selected and trained on a given dataset. However, it should be understood that the model could be trained after the following steps are performed to modify the base model to become input-adaptive. At step 600, the application optionally creates a ranking of the filters of the trained model. As described above, this can be done in a collective-importance manner for increased efficiency in subsequent steps, or can simply be done using a standard approach. At step 604, the application performs an early exit architecture search. This involves designing the computational complexity and location of early exits to be inserted into the trained model. In one embodiment, this can entail inserting early exits at every convolutional layer, followed by pruning and optimization using any of the techniques described herein. Next, at step 608, an early exit rate is determined for the model. This can be done by determining the minimum threshold of a confidence level for a given video frame such that the output of the DNN won't lose an unacceptable level of accuracy. At step 612, the application may optionally prune inefficient early exits to result in a model with only the most helpful early exit locations. At step 616, the modified model is stored and will be used in place of the original trained model going forward. At step 620, just before runtime, a resource-accuracy profile is optionally determined for the model, so that adaptive optimizations can be made during runtime.

FIG. 6(*b*) shows a process flow chart for runtime actions involved in utilizing an input-adaptive DNN. At step 640, the application loads an input adaptive DNN. At step 644, the application acquires fr, Cr, and an energy budget. At step 648, the application determines a latency budget. At step 652, the application determines an optimal a. At step 656, the application sets an early exit confidence level threshold based on a. At step 660, the application receives an input frame. At step 664, the application runs the DNN using the optimal early exit confidence level threshold. At step 668, the application can determine whether or not the early exit was triggered. If the early exit was triggered, the application proceeds to step 680, runs the early exit DNN, and proceeds to step 676. Otherwise, the application proceeds to step 672. At step 672, the supplication continues running the full DNN. At 676, the application outputs a classification result.

Figure 7A:
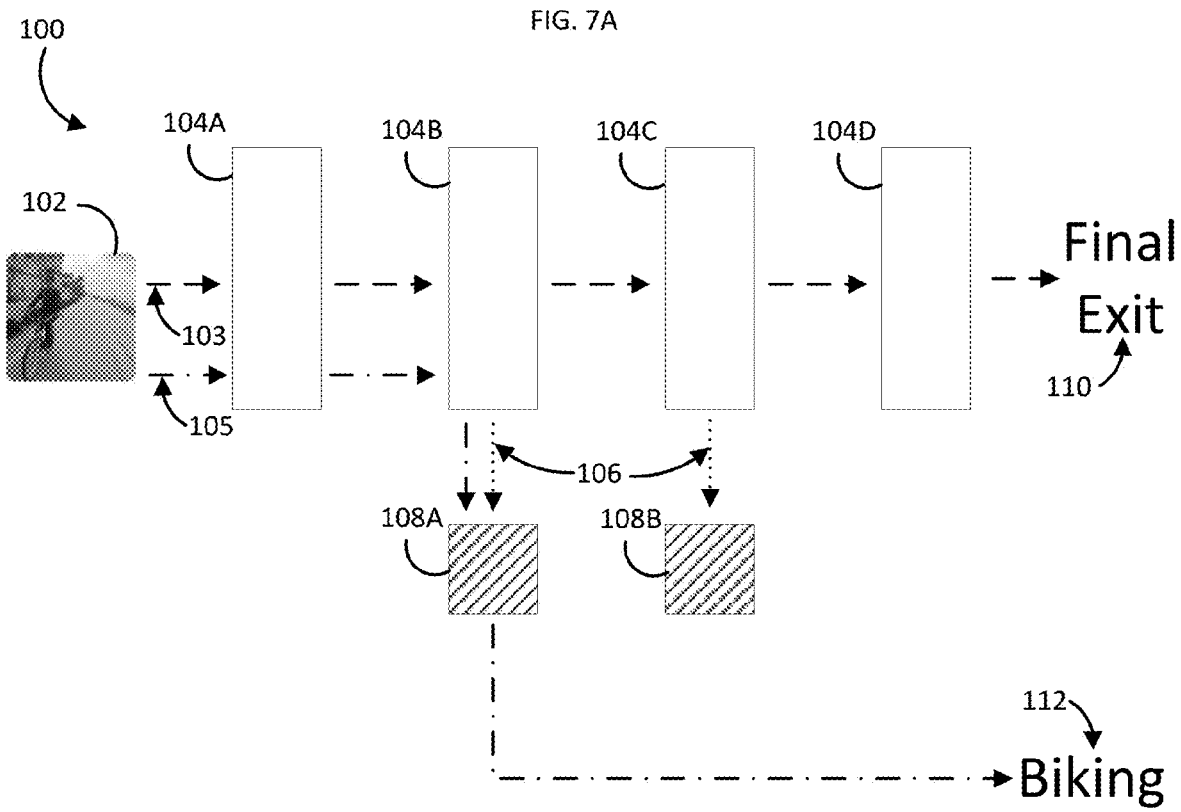
FIG. 7(a) shows a flowchart of an exemplary data processing flowpath.

Referring to FIG. 7A, a conceptual overview of an exemplary data processing flowpath of an input 102 (such as an image being classified by a neural network 100) is shown. The neural network includes one or more base layers 104A-D and one or more optional early exits 108A-B. It will be understood that, according to various implementations of the techniques herein, there could be more or fewer than the two depicted early exits 108A-B, and the location of the early exits could be predetermined, or determined according to the techniques above for setting early exist architecture.

A standard data processing flowpath 103 represents how the neural network 100 would classify the input 102 without the early exits 108-B, passing data through every base layer 104-D regardless of input, culminating in a final exit output 110. The Final Exit output would be an inference output giving likelihood that the input contained certain features of interest (e.g., an indication of likelihood the image contained the human activity of biking).

Optional early exit data processing flowpaths 106 are also show. As discussed above, a neural network 100 can be modified to include early exit points at certain base layers 104B-C. Thus, for instances when an "easy" data input unit is provided to the neural network, easy input flowpath 105 represents how the neural network 100 would classify the input 102, culminating in an early exit output 112. As shown, when the easy input data processing flow reaches the first early exit point 104B, the network determines that it has already reached an acceptable level of inference confidence, and thus does not need to continue further processing using the full network. The input then is processed by the early exit layer, and an output is returned similar to the output that would have ordinarily been provided by the full network.

Figure 7B:
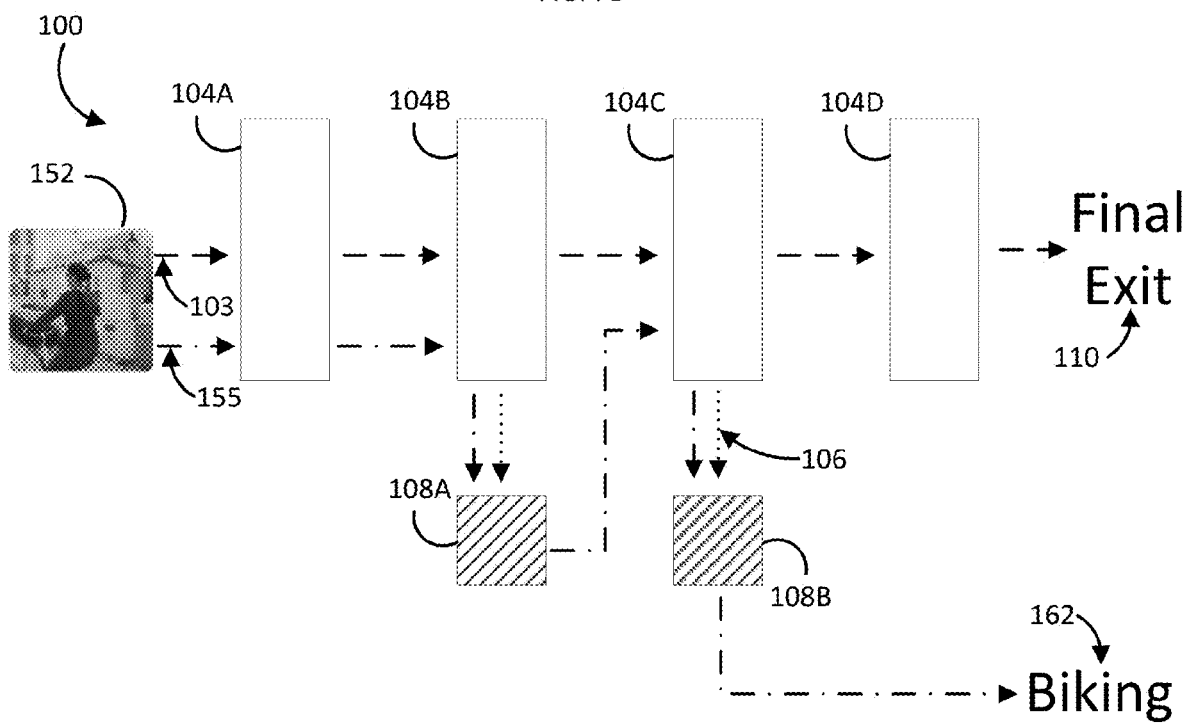
FIG. 7(b) shows another flowchart of an exemplary data processing flowpath.

Referring to FIG. 7B, an exemplary flowpath of a second input 152 such as an image being classified by the neural network 100 is shown. This time, the data processing flowpath depicts how the network would process a more difficult input (e.g., such as when not all of the bicycle is visible in the image). A hard input flowpath 155 represents how the neural network 100 would classify the input 152 when the input 152 is relatively difficult to classify. In this circumstance, the network has not achieved a threshold level of inference confidence at the first early exit point.

Thus, the data processing flowpath continues to follow the full network, skipping early exits and utilizing the full layers until processing reaches a given early exit point at which the network determines that it has achieved sufficient confidence. At that point, the data processing exits the full network, processes the data using the corresponding early exit layer, culminating in a second early exit output 162. In other circumstances, if the image frame (or other input unit) was very clearly not of a class the model was trained to identify (e.g., the image very clearly did not contain any human activity, like a simple picture of the ocean), the network might again exit early at the first early exit point. In contrast, if the image frame was very difficult to assess (e.g., it was an image with many people, many billboards of bicycles, and an overall high level of content density), the network might not exit early at all. For many applications (especially when there will be variability and unpredictability in the input stream), the flexible, adaptive techniques herein provide the optimal early exit patterns to minimize computational latency while also meeting the functional requirements (e.g., accuracy) of the particular application being powered by the DNN.

As is made evident from FIG. 7, the adaptive neural network is built on top of (or is a modified version of) a base convolutional neural network model. The base model has been modified to include an early exit architecture as disclosed above. The threshold for how and when early exits are made is adaptive, taking into account a variety of factors relating to the specific purpose of the application using the DNN (e.g., merely a confidence threshold that has been predetermined, or taking into account whether latency, energy usage, or accuracy is more important, and any minimum thresholds of any of them), the attributes of the input stream (e.g., frame rate), and the constraints of the system operating the DNN. For example, when the network is made adaptive and flexible, it can operate cross-platform (e.g., iOS, Android, and the like) and cross-system to fit the resources and constrains available.

Methods and Techniques for Mobile Video Stream Analytics

Embodiments of the systems and techniques described above can be used to modify deep neural network models so that they can be dynamically adaptive to runtime conditions, including resource constraints and characteristics of input data streams. While several examples described herein regard using these systems and techniques to allow a DNN to keep up with processing each frame of a video stream, it should be recognized that the advantages of these systems and techniques (e.g., allowing for adaptable computational needs at runtime, including by optimizing early exits of the DNN) can be utilized in other contexts, such as for processing other data streams or operating DNNs in systems with variable resource demands (e.g., many other applications running or periodic high computational tasks).

For purposes of illustration only and without limitation, various example embodiments and implementations of various techniques and features described herein will now be discussed in the context of continuous computer vision applications within mobile devices. In one sample implementation, MobileNetV1 and MobileNetV2 can be taken as example DNN models which will be transformed and modified to build input-adaptive, computation-efficient variations of these models. MobileNets are state-of-the-art computation-efficient DNN models that are already designed for the computational environments of mobile platforms. However, as will be discussed below, the systems and methods herein can even further improve the performance of the MobileNets in terms of computational efficiency.

For purposes of the three following example, early exits are inserted at the filters within the depthwise layers of the depthwise convolution blocks of MobileNetV1 and the inverted residual blocks of MobileNetV2.

Example 1: Activity Recognition on Mobile Phones. Automatic identification and labeling of human activities in videos is a capability that could become an attractive feature for smartphones. Such an application would aim to recognize activities performed by an individual from video streams captured by mobile phone cameras, which could be used for a variety of purposes (both entertainment and safety/healthcare). To validate that a DNN modified in accordance with techniques disclosed herein can accurately identify activity from a video stream, the UCF-101 human activity dataset was used. UCF-101 contains video clips of 101 human activity classes captured by either fixed or mobile cameras in the wild. Video clips of 15 activities (e.g., biking and skiing) captured by mobile cameras were selected as an example dataset (named UCF-15). Using this dataset, the inventors built and validated their application. UCF-15 consists of 1,080K video frames. This dataset was then subdivided into training and test videos.

Example 2: Scene Understanding for Augmented Reality. Scene understanding is one of the core capabilities of augmented reality. This application aims to recognize places from video streams captured by head-mounted cameras. To design this application, a new database of video clips was collected in the wild with IRB approval due to lack of publicly available datasets. During data collection, participants were instructed to collect first-person view video footage from diverse places by wearing the ORDRO EPS head-mounted camera. Frames in all the video clips are manually labelled. From the labeled video clips, the eight most common places that participants visited (e.g., parking lot, kitchen) were selected as a reference dataset (named Place-8) to build and evaluate this application. Place-8 consists of 123K video frames. To avoid model overfitting, the same 8 places from Places-365 as were used as the training set, and self-collected video frames as test set.

Example 3: Drone-based Traffic Surveillance. Due to its mobility, a traffic surveillance drone is able to track traffic conditions in a large area with an extreme low cost that traditional fixed video camera-based traffic surveillance systems could not provide. This application aims to detect vehicles from video streams captured by drone cameras. Due to lack of publicly available datasets, we use one of the most advanced commercial drones, DJI Mavic Pro, to collect our own traffic surveillance video clips in the wild with IRB approval. To ensure diversity, videos were recorded under various drone camera angles (25° to 90°), flying heights (2.5 m to 51.2 m), speeds (1 m/s to 11.2 m/s), weather conditions (cloudy, sunny), and road types (residential, urban, highway). Frames in all video clips are manually labelled. This dataset (named TDrone) consists of 146K video frames. The TDrone dataset was split into 15% and 85% for training and testing.

An input-adaptive DNN scheme was then implemented in TensorFlow for each of the three Examples identified above. For each of the three Examples, an input-adaptive approach in accordance with techniques disclosed herein was used to generate an input-adaptive computation-efficient model from MobileNetV1 and MobileNetV2 respectively for our evaluation. The three applications, two base models, and six models generated by these techniques are listed in Table 1 below.

| Application | Target Mobile Platform | Dataset | Number of Frames | Base Model | Input-adaptive Model |
|---|---|---|---|---|---|
| Activity Recognition | Mobile Phone | UCF-15 | 1,080K | MobileNetV1, MobileNetV2 | M1-U, M2-U |
| Scene Understanding | AR Headset | Place-8 | 123K | MobileNetV1, MobileNetV2 | M1-P, M2-P |
| Traffic Surveillance | Drone | TDrone | 146K | MobileNetV1, MobileNetV2 | M1-T, M2-T |

Evaluation

The content adaptive models were compared with three baselines: (a) MobileNetV1 and MobileNetV2 (i.e., content agnostic); (b) BranchyNet; and (c) BranchyNet-All. As described above, BranchyNet is based on the coarse-grained early exit design, and uses bulky and computationally inefficient DNN models including ResNet-110, LeNet, and AlexNet as its base models which are rarely used to build modern mobile vision applications. To strengthen the baseline, MobileNetV1 and MobileNetV2 were used as the base models for BranchyNet. BranchyNet-All is a modified version of BranchyNet which inserts early exits at the outputs of all of the layers of the neural network. In doing so, BranchyNet-All prioritizes exiting frames as early as possible but incurs more overhead.

To match the three applications to their target mobile platforms, M1-U and M2-U of the Activity Recognition application were deployed on a Samsung Galaxy S8 smartphone and run them on the smartphone CPU; M1-P and M2-P of the Scene Understanding application described above as well as M1-T and M2-T of the Trac Surveillance application were deployed on a NVIDIA Jetson Xavier development board [2] and were run on the onboard GPU. NVIDIA Xavier was chosen because it is the state-of-the-art mobile GPU designed for next-generation DNN-based intelligent mobile systems such as AR headsets, drones, and robots.

Three metrics were used to evaluate the performance of an input-adaptive DNN as described herein (for shorthand purposes, and without limitation, it will be referenced as "FlexDNN") and the baselines: 1) inference accuracy: Top-1 accuracy of all the video frames in the test set was used as the metric of inference accuracy; 2) computational cost: average CPU/GPU processing time (with 100% CPU/GPU utilization) per frame was used as the metric of computational cost; 3) energy consumption: computational cost directly translates to energy consumption. Thus, the average energy consumption per frame was used as the third metric.

Model Performance

Below, the models generated by FlexDNN are profiled to highlight their key characteristics.

High Early Exit Rate. The generated FlexDNN model is able to achieve high early exit rates through its early exits without loss of accuracy. To quantify this characteristic, each of the six models was profiled on the test set, and the cumulative exit rate is measured at each early exit.

Referring now to FIG. 8, the locations of the inserted early exits (e.g., L5_140 represents that the early exit is located at the 5th layer with 140 filters as its input) and their cumulative exit rates are shown. Specifically, FIGS. 8(a)-8(f) shows the locations for M1-U, M2-U, M1-P, M2-P, M1-T, and M2-T techniques respectively. As shown, for each of the six models, the increasing cumulative exit rates imply the significance of each inserted early exit. Accumulatively, these early exits are able to exit 93.6%, 91.2%, 75.9%, 91.0%, 77.9%, and 87.3% of the frames on M1-U, M2-U, M1-P, M2-P, M1-T, and M2-T, respectively. This result indicates that the FlexDNN-based technique is effective at identifying efficient early exits while pruning less efficient ones.

Figure 9A:
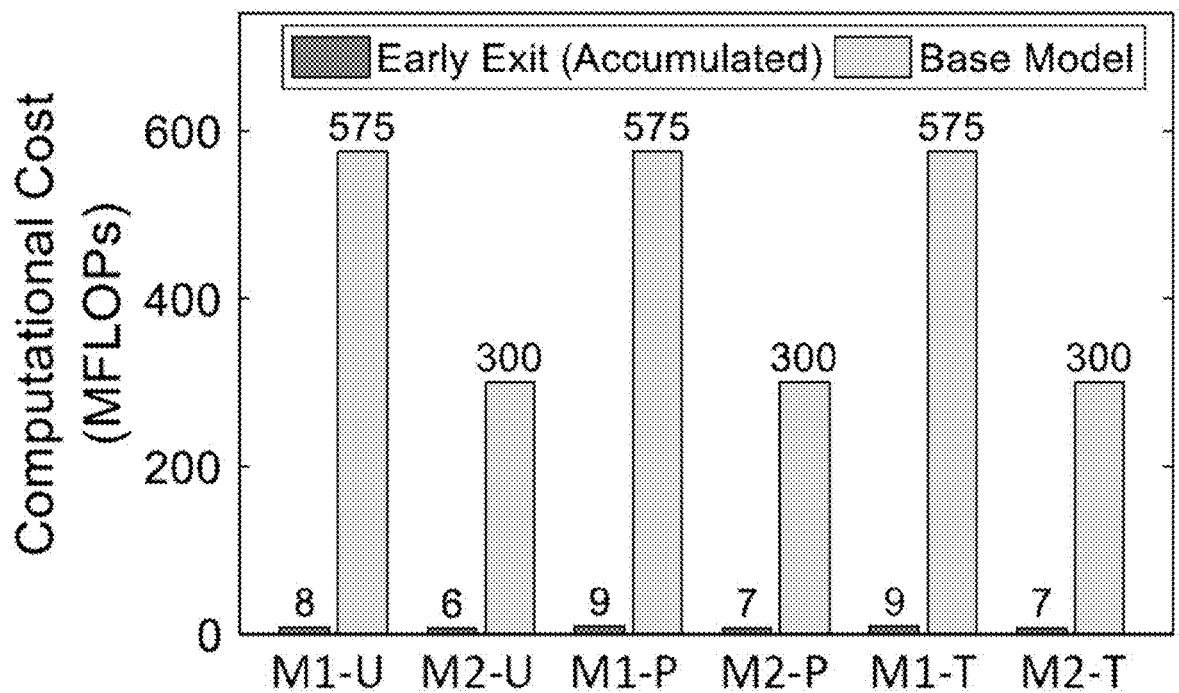
FIG. 9(a) shows accumulated computational cost of early exits of a DNN model according to certain techniques herein.

Computation Efficient Early Exits. The early exits incorporated in the generated FlexDNN models are computation-efficient. To quantify this characteristic, the accumulated computational cost of all the early exits of the FlexDNN model was compared with the computational cost of its base model. As shown in FIG. 9(a), the accumulated computational cost of all the early exits of the FlexDNN model is only 1.4%, 2.1%, 1.6%, 2.3%, 1.6%, and 2.5% of its own base model for M1-U, M2-U, M1-P, M2-P, M1-T, and M2-T, respectively, indicating that even in the worst case scenario where a video frame goes through all the inserted early exits, these exits altogether incur marginal computational overhead compared to the base model.

Figure 9B:
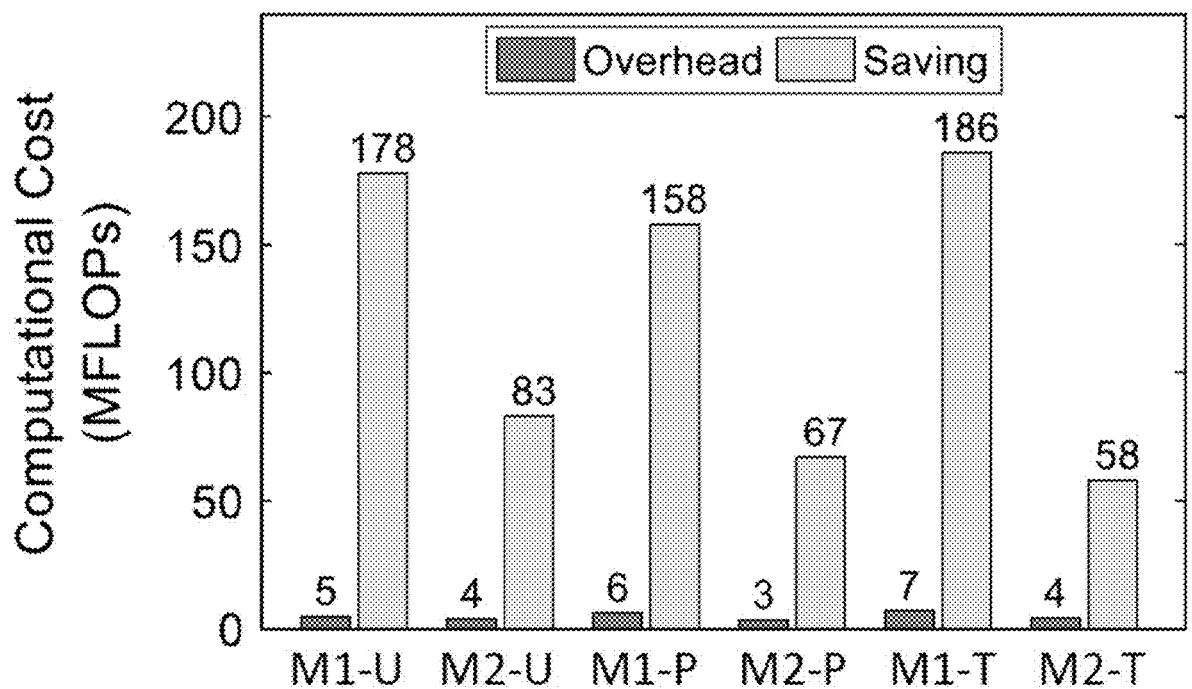
FIG. 9(b) shows overhead savings for an input-adaptive DNN.
Figure 10A:
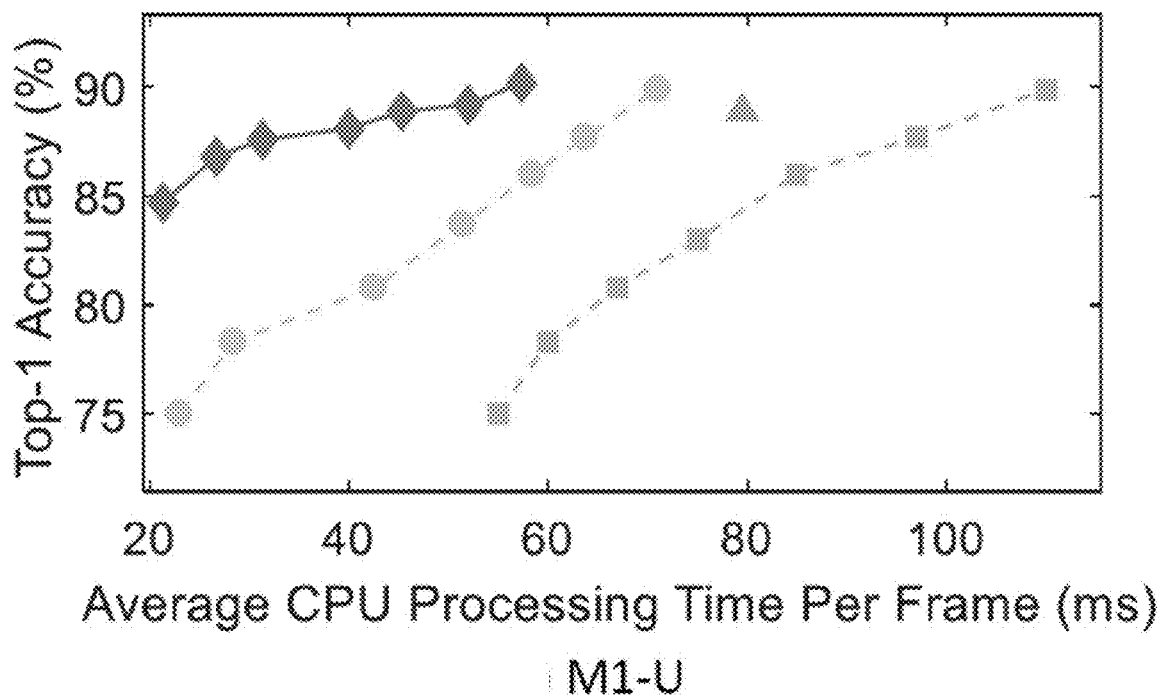
FIGS. 10(a)-(f) show techniques for flexible DNNs compared with baselines in the accuracy-frame processing time space.
Figure 10B:
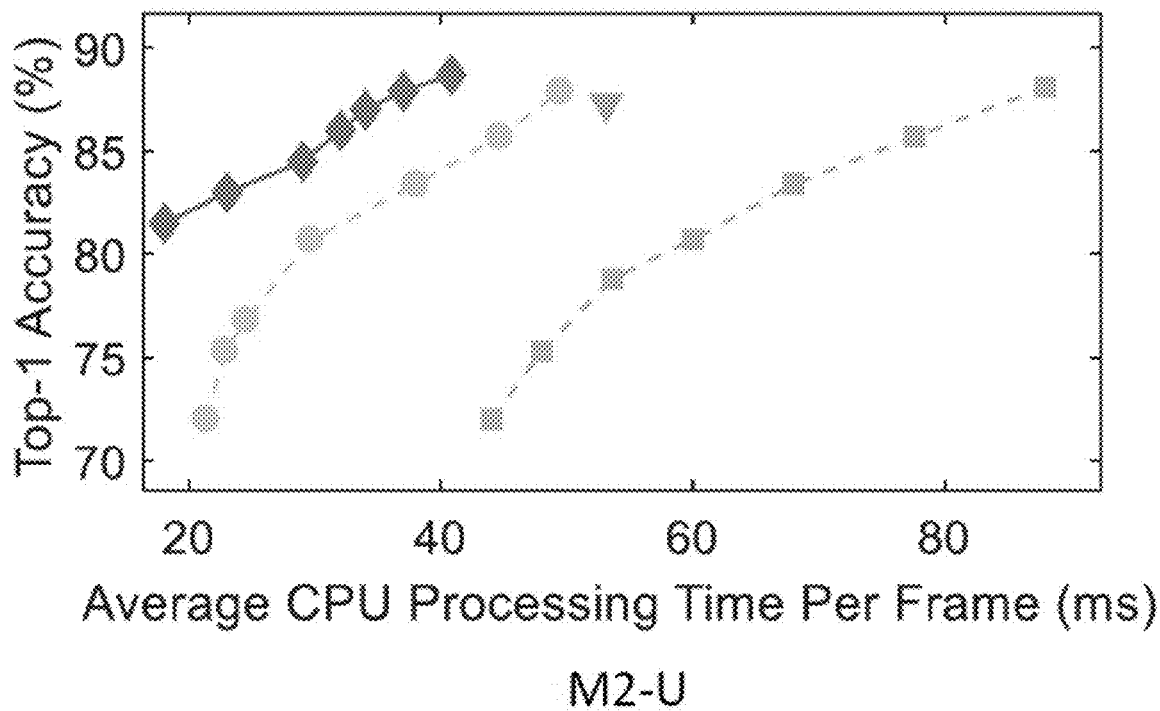
Figure 10C:
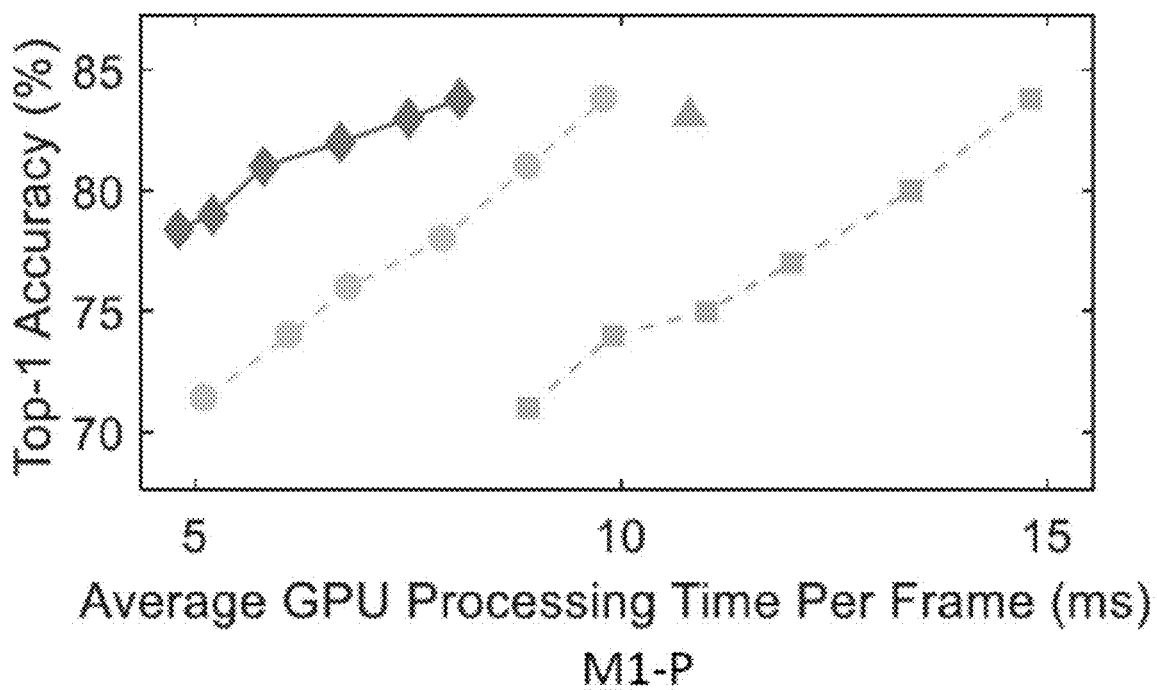
Figure 10D:
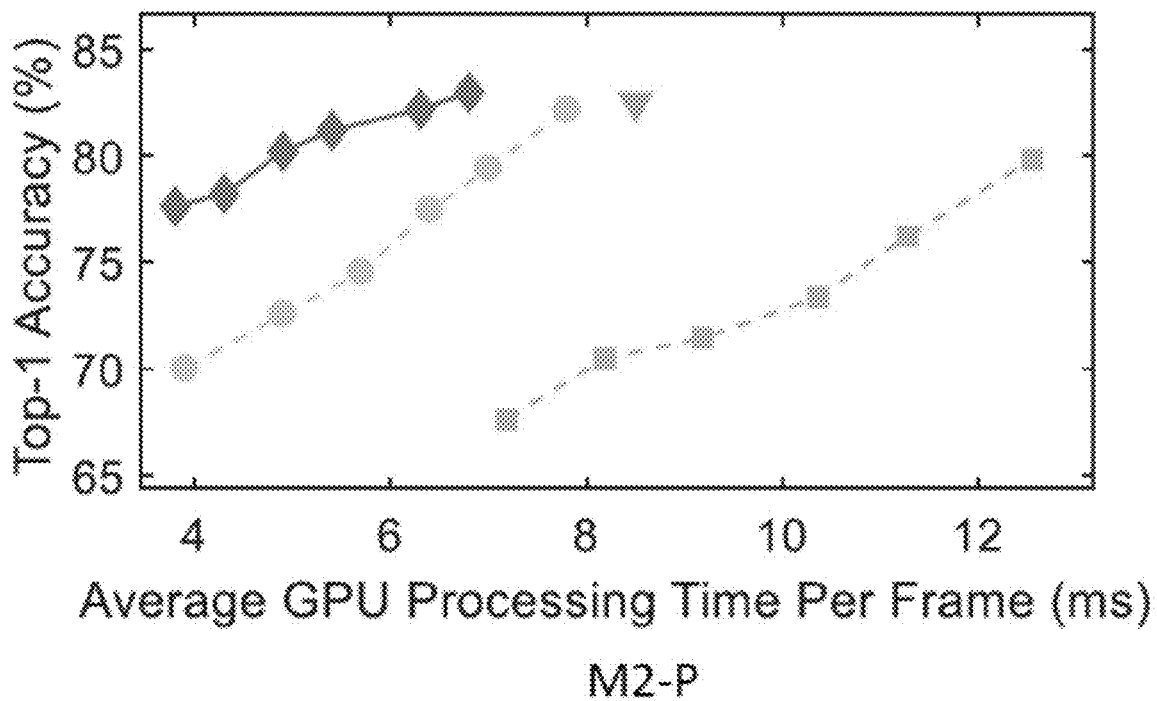
Figure 10E:
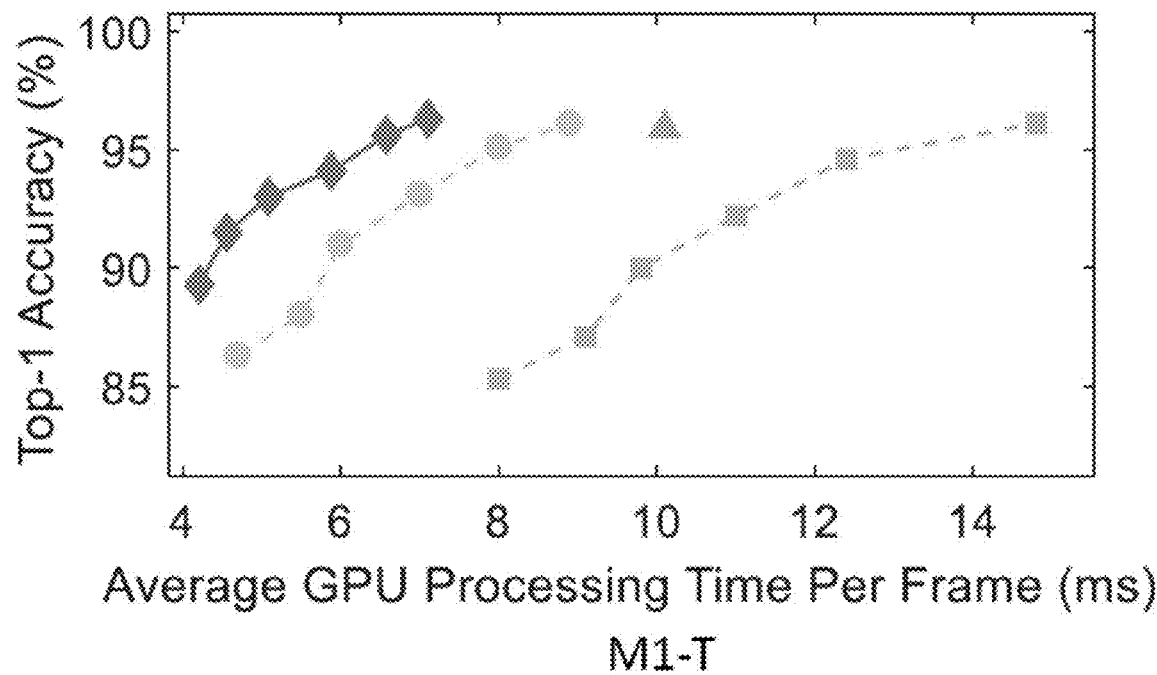
Figure 10F:
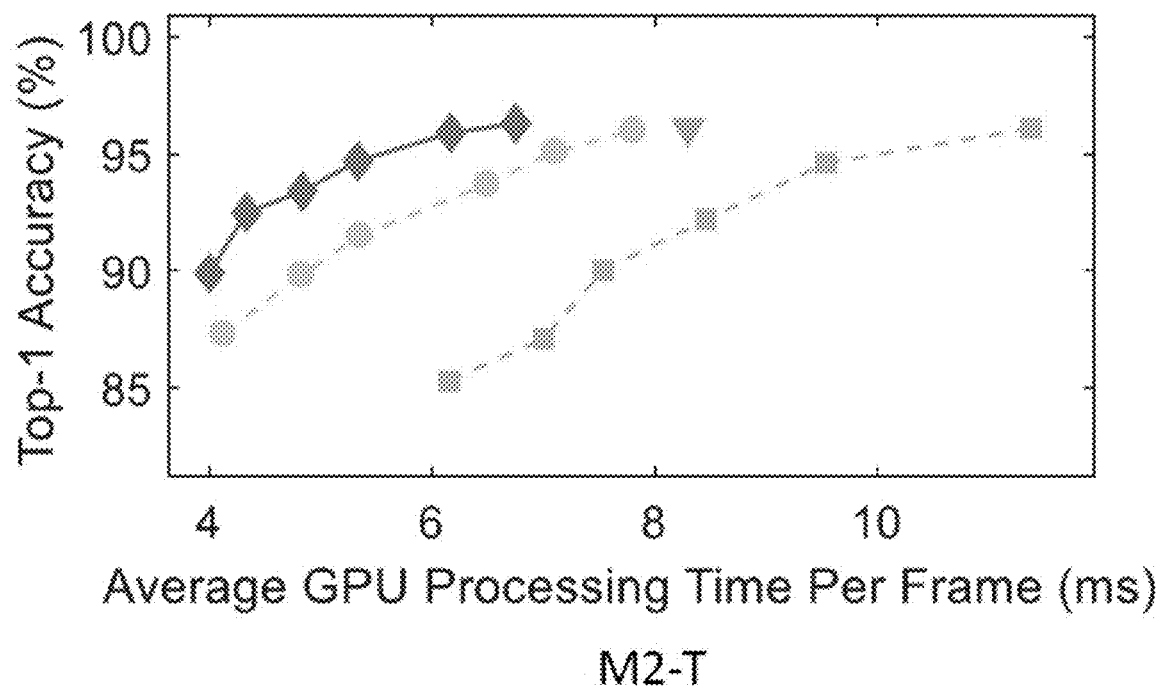

High Computational Consumption Reduction. Because of the high early exit rate and the computation-efficient early exit design, the generated FlexDNN model is able to achieve high computational consumption reduction. To quantify this characteristic, the average computation saved from early exiting per frame was used to quantify the saving; and the average computation consumed by the early exits each frame goes through but fails to exit was used to quantify the overhead. As shown in FIG. 9(b), the overhead is substantially lower than the saving for each model: the saving-overhead-ratio is 37×, 22×, 26×, 20×, 27×, and 14× for M1-U, M2-U, M1-P, M2-P, M1-T, and M2-T, respectively. As will be shown in the next subsection, the achieved high saving overhead-ratio is directly translated into various system performance improvement at runtime.

Top-1 Accuracy vs. Frame Processing Time. Referring now to FIG. 10(a)-(f), FlexDNN is compared with the baselines in the accuracy-frame processing time space for M1-U, M2-U, M1-P, M2-P, M1-T, and M2-T techniques respectively. For FlexDNN, each blue diamond marker on the blue curve represents the runtime performance obtained by using a particular a value defined in Eqs. (9 and 13). For fair comparison, both BranchyNet and BranchyNet-All were configured in the same way to generate the corresponding curves. Three main observations were made. First, FlexDNN outperforms both MobileNetV1 and MobileNetV2, which represent state-of-the-art content-agnostic computation-efficient DNN models designed for mobile platforms. Under the same accuracy achieved by MobileNets, FlexDNN reduces the computational consumption by 29.3%, 24.1%, 24.9%, 19.6%, 31.0%, and 18.7% on M1-U, M2-U, M1-P, M2-P, M1-T, and M2-T. This result demonstrates the superiority of FlexDNN due to its input-adaptive capability. Second, FlexDNN also outperforms BranchyNet across the accuracy-frame processing time space. Across the space, FlexDNN on average reduces the computational consumption by 41.2%, 12.1%, 23.1%, 24.1%, 16.6%, and 11.8% on M1-U, M2-U, M1-P, M2-P, M1-T, and M2-T. This result demonstrates the superiority of FlexDNN due to its fine-grained design and architecture superiority. Third, BranchyNet-All has the worst accuracy-frame processing time profile. In particular, under the same (or close) accuracy as MobileNets, BranchyNet-All consumes much more computations. This result indicates that the overheads incurred by early exits already diminish the benefit they bring, emphasizing the importance of the derived optimal early exit insertion plan.

Reduction on Energy Consumption. Computational cost directly translates to energy consumption. Besides reducing frame processing latency, FlexDNN also consumes considerably less energy compared to baselines. BranchyNet-All was not included below due to its poor off-the-charts performance.

Referring now to FIG. 11, energy consumption of various techniques is shown. Under the same accuracy achieved by MobileNets, FlexDNN reduces the energy consumption by 27.8%, 21.8%, 25.8%, 18.4%, 29.6%, and 16.4% on M1-U, M2-U, M1-P, M2-P, M1-T, and M2-T. FIGS. 11(a)-(f) show energy consumption for M1-U, M2-U, M1-P, M2-P, M1-T, and M2-T techniques respectively Compared to BranchyNet, FlexDNN on average reduces the energy consumption by 38.4%, 13.2%, 20.8%, 22.1%, 12.9%, and 10.1% energy consumption on M1-U, M2-U, M1-P, M2-P, M1-T, and M2-T across the entire accuracy-energy consumption space.

Performance of Runtime Adaptation. Finally, the performance of runtime adaptation to workload and system resource dynamics is compared between FlexDNN and BranchyNet. MobileNets were not included here because they do not provide runtime accuracy-resource trade-off mechanism. BranchyNet-All was not included due to its poor performance.

Simulation techniques were used to create both workload and system resource dynamics. In particular, to simulate workload dynamics, the streaming video frame rate was increased from 12 FPS to 25 FPS for M1-U and M2-U (Samsung S8); and from 18 FPS to 30 FPS for M1-P, M2-P, M1-T, and M2-T (Nvidia Xavier). To simulate system resource dynamics, CPU utilization was decreased from 75% to 50% for M1-U and M2-U (Samsung S8); and GPU utilization was decreased from 20% to 15% for M1-P, M2-P, M1-T, and M2-T (Nvidia Xavier). A smaller ratio of resources was allocated on Nvidia Xavier GPU because it is more powerful than Samsung S8 CPU.

Referring now to FIG. 12, the results of the above simulations are shown. When the resource constraint is less tight (Res=75% for S8, FIG. 12(a)-(b); Res=20% for Xavier, FIG. 12(c)-(f)) and workload is low, FlexDNN and BranchyNet achieve comparable accuracies. However, as the workload increases, the accuracy of FlexDNN remains high while the accuracy of BranchyNet drops significantly. When the resource constraint is tight (Res=50% for S8, Res=15% Xavier) and workload is the highest, FlexDNN outperforms BranchyNet by largest margins. In particular, FlexDNN outperforms BranchyNet by 9.0%, 9.2%, 5.5%, 7.4%, 5.6%, and 5.0% in accuracy on M1-U, M2-U, M1-P, M2-P, M1-T, and M2-T, respectively.

Figure 13:
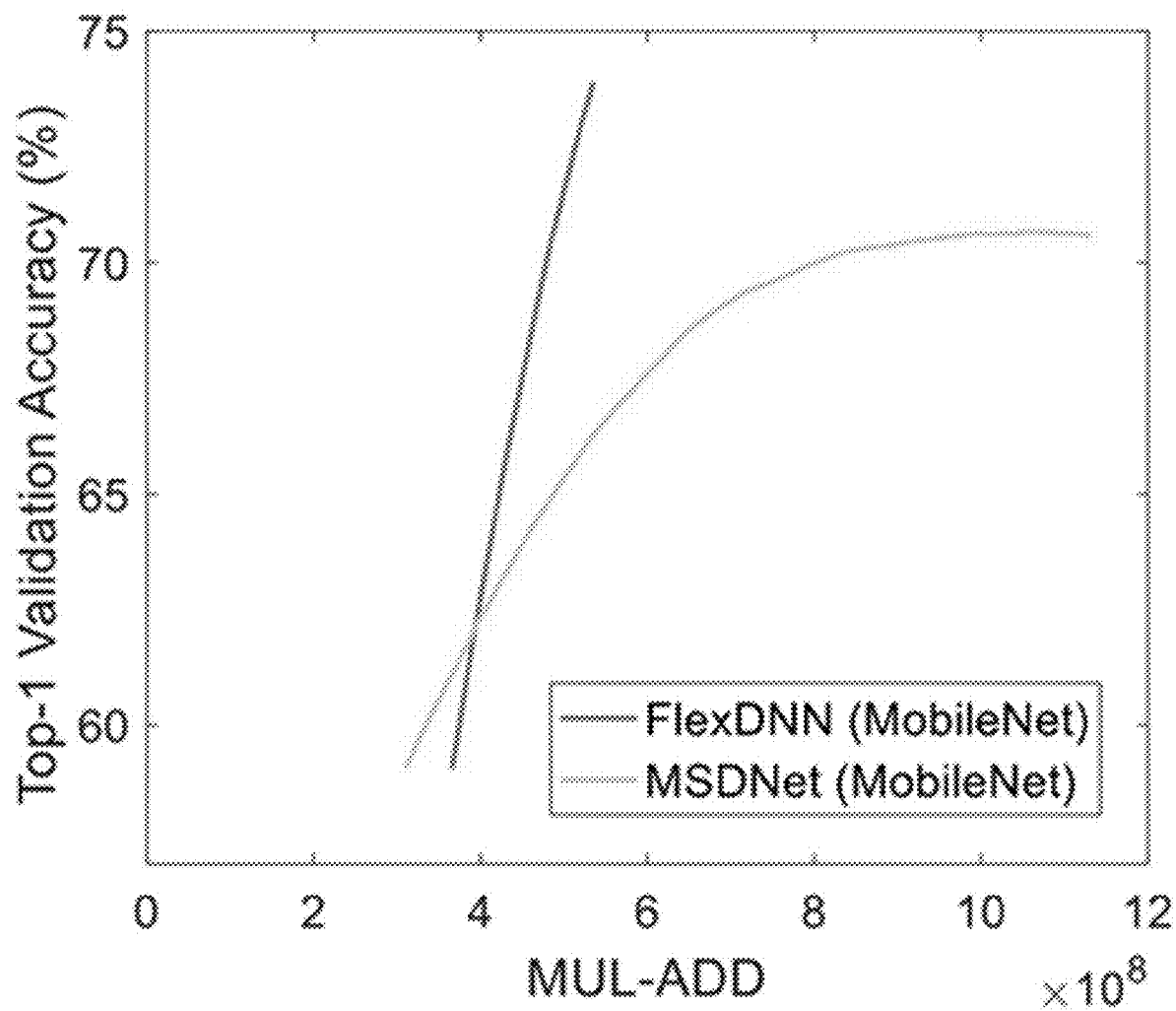
FIG. 13 shows a chart of validation accuracy performance of FlexFNN and NSDNet techniques.

Finally, the performance of FlexDNN is compared to the performance of another DNN early exit technique, MSDNet, on the ImageNet dataset—a dataset of static image files. To make a fair comparison, an experiment was performed in which both FlexDNN and MSDNet used MobileNetV2 for their base model. From FIG. 13, there are several key observations. First, at the highest top-1 validation accuracy of MSDNet (MobileNet) (i.e., 70.6%), FlexDNN (MobileNet) consumes 51.3% less FLOPs compared to MSDNet (MobileNet). Second, when top-1 accuracy is allowed to be reduced by 5% (i.e., 65.6%), FlexDNN (MobileNet) consumes 17.9% less FLOPs compared to MSDNet (MobileNet). Third, MSDNet (MobileNet) consumes less FLOPs than FlexDNN (MobileNet) when the top-1 validation accuracy is lower than 62.2%. However, considering that the accuracy is much lower than the highest accuracy, such models are less practically useful even if they have less FLOPs. Lastly, FlexDNN is able to achieve higher top-1 accuracy (74.0%) compared to MSDNet (MobileNet) (70.6%). In sum, FlexDNN is able to outperform MSDNet on ImageNet dataset.

IMPLEMENTATIONS AND EMBODIMENTS

Figure 14:
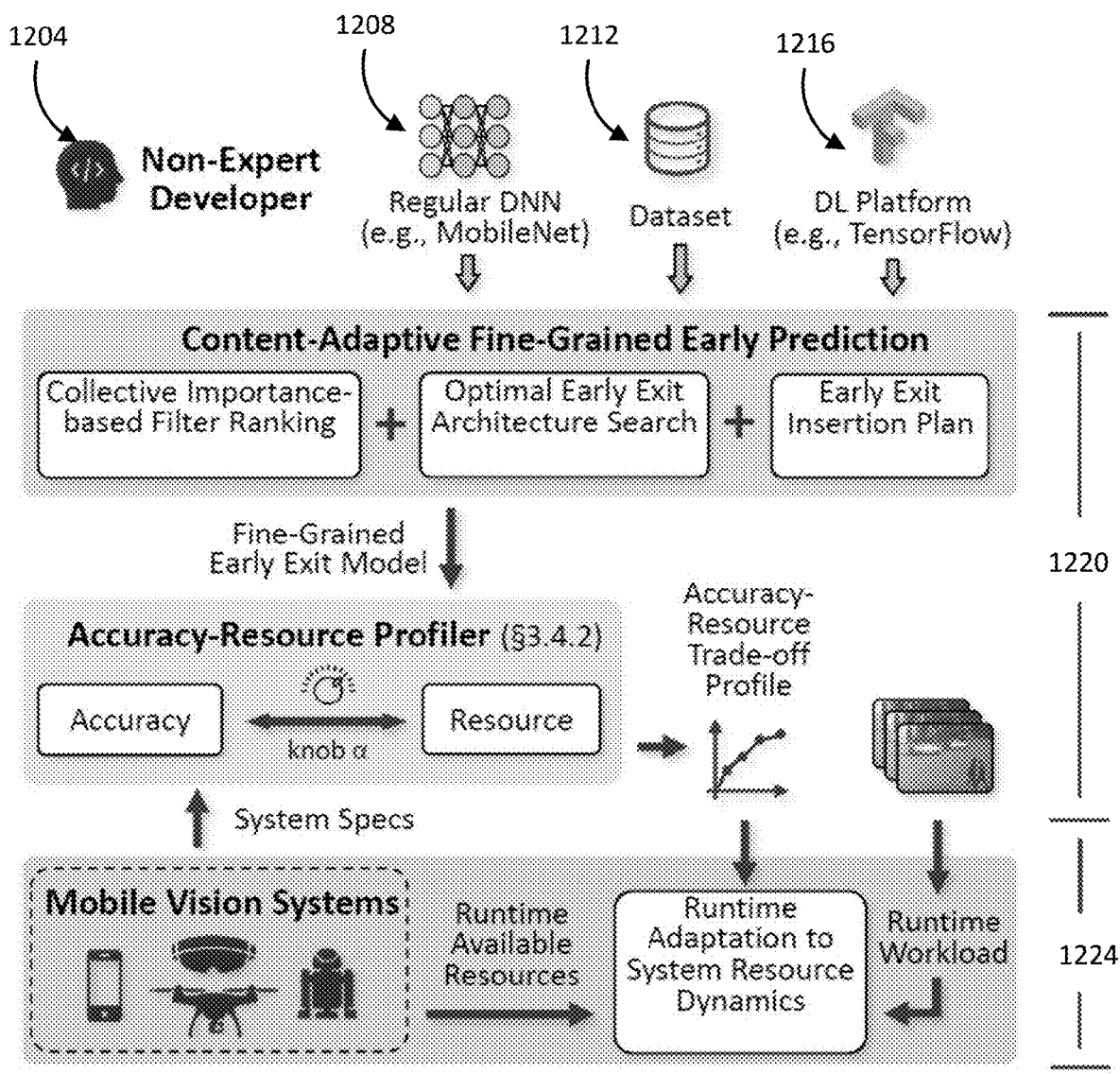
FIG. 14 shows a block diagram overview of a input-adaptive DNN.

FIG. 14 shows a block diagram overview of a system implementing an input-adaptive DNN application according to various techniques described above. A developer 1204 can select a deep neural network 1208 such as MobileNet trained on a dataset 1212 such as a video dataset as described above and a deep learning platform 1216 such as TensorFlow. The developer 1204 can then use an offline method 1220 and a runtime method to implement the early exit techniques described above. The offline method 1220 can include the steps of the method described in conjunction with FIG. 6(a) above, and the runtime method 1224 can include the steps of the method described in conjunction with FIG. 6(b) above.

In other words, a trained deep neural network model can be modified so that it has an optimized early exit architecture. Then, the modified model (and associated early exit models) can be loaded onto a memory of a device that will utilize the model (e.g., an autonomous vehicle, or mobile phone). In one optional "add-on" feature, a user or manufacturer of the device can preset the "knob" of accuracy/resource tradeoff prior to runtime, or can set the knob to dynamically adjust based on runtime computational and energy resources available on the device. Then, during runtime, the model can adapt itself to increase or decrease the rate of early exits and/or the threshold at which an input (e.g., a video frame) would jump to an early exit model.

Various designs, implementations, and associated examples and evaluations of an input-adaptive framework for computation-efficient DNNs has been disclosed. This framework addresses the limitations of existing work and pushes the state-of-the-art forward through its innovative fine-grained design and automatic approach for generating an optimal architecture based on early exits for input adaptation. Techniques disclosed herein were used to build three continuous mobile vision applications on top of MobileNetV1 and V2, and used both mobile CPU and GPU platforms for runtime evaluation. However, it is to be understood that the techniques for transforming a trained DNN into an input-adaptive DNN can apply to any circumstances in which a suitable DNN might be utilized. The present invention has been described in terms of one or more preferred embodiments, and it should be appreciated that many equivalents, alternatives, variations, and modifications, aside from those expressly stated, are possible and within the scope of the invention.

The invention claimed is:

1. A system for processing inputs using a neural network, the system comprising:
    a processor;
    at least one data input source;
    a memory having stored thereon: an input-adaptive neural network comprising a set of layers and early exit points, each early exit point having an output layer, and a set of instructions which, when executed by the processor, cause the system to:
        acquire a series of input data units from the data input source;
        process a data unit of the series using only a subset of the layers of the input-adaptive neural network, prior to a first early exit point, wherein the first early exit point is placed at a first location in the input-adaptive neural network based on an architecture search optimization previously performed on the input-adaptive neural network;
        determine a first predictive result using the output layer of the first early exit point;
        determine whether the first predictive result meets an accuracy-threshold, and if so stop further processing of the data unit such that at least some layers of the input-adaptive neural network are not used to process the data unit;
        determine whether the first predictive result does not meet an accuracy threshold, and if not process the data unit of the series using a further subset of the layers of the input-adaptive neural network and a second early exit point;
        output a second predictive result using the output layer of a second early exit point, wherein the second early exit point is placed at a second location in the input-adaptive neural network based on the architecture search optimization previously performed on the input-adaptive neural network;
        determine, using the second early exit point, whether the second predictive result meets the accuracy threshold, and if so, stop processing the data unit using further output layers of the set of output layers in response to the second predictive result meeting the accuracy-threshold; and
        determine whether the second predictive result does not meet the accuracy threshold, and if not process the data unit of the series using all remaining layers of the input-adaptive neural network, including a final output layer thereof.

2. The system of claim 1, wherein the at least one data input source is a video camera.

3. The system of claim 1, wherein the input data units are image frames.

4. The system of claim 1, wherein the input-adaptive neural network is a convolutional neural network having an early exit architecture that was determined via an automated process.

5. The system of claim 1, wherein the instructions further cause the system to process a subsequent data unit using the input-adaptive neural network, wherein a computational demand of the subsequent data unit is different than the computational demand of processing the data unit.

6. A system for processing inputs using a neural network, the system comprising:
    a processor;
    at least one data input source;
    a memory having stored thereon an input adaptive neural network comprising a set of layers and early exit points, each early exit point having an output layer, and a set of instructions which, when executed by the processor, cause the system to:
        acquire a series of input data units from the data input source;
        process a first data unit of the series using only a subset of the layers of the input adaptive neural network, prior to a first early exit point, wherein the first early exit point is placed at a first location in the input-adaptive neural network based on an architecture search optimization previously performed on the input-adaptive neural network;
        process a second data unit of the series using only the subset of the layers of the input adaptive neural network, prior to the first early exit point; and
        determine a first predictive result and a second predictive result using the output layer of the first early exit point, corresponding to the first data unit and the second data unit, respectively;
        determine whether the first predictive result meets an accuracy-threshold, and if so, stop further processing of the first data unit such that at least some layers of the input-adaptive neural network are not used to process the first data unit;
        determine whether the second predictive result meets the accuracy threshold, and if so, stop further processing of the second data unit such that at least some layers of the input-adaptive neural network are not used to process the second data unit;

output a third predictive result and a fourth predictive result using a second early exit point output layer, corresponding to the first data unit and the second data unit, respectively;

determine whether the third predictive result does not meet the accuracy-threshold, and if not, process the first data unit of the series using all remaining layers of the input-adaptive neural network, including a final output layer thereof, wherein the second early exit point is placed at a second location in the input-adaptive neural network based on the architecture search optimization previously performed on the input-adaptive neural network; and determine whether the fourth predictive result does not meet the accuracy threshold, and if not, process the second data unit of the series using all remaining layers of the input-adaptive neural.

7. A system for processing inputs using a neural network, the system comprising:

a processor;

at least one data input source;

a plurality of layers, each layer comprising a plurality of selected filters, wherein a first selected filter of the plurality of selected filters was selected from a plurality of unranked filters based on a first difference between a first output of a respective layer with the plurality of unranked filters and a second output of the respective layer with a first set of the plurality of unranked filters, the first set comprising the plurality of unranked filters other than the first selected filter;

a memory having stored thereon: an input-adaptive neural network comprising a set of layers and early exit points, each early exit point having an output layer, and a set of instructions which, when executed by the processor, cause the system to:

acquire a series of input data units from the data input source;

process a data unit of the series using only a subset of the layers of the input-adaptive neural network, prior to a first early exit point;

determine a first predictive result using the output layer of the first early exit point;

determine whether the first predictive result meets an accuracy threshold, and if so stop further processing of the data unit such that at least some layers of the input-adaptive neural network are not used to process the data unit;

determine whether the first predictive result does not meet an accuracy threshold, and if not process the data unit of the series using a further subset of the layers of the input-adaptive neural network and a second early exit point;

output a second predictive result using the output layer of a second early exit point;

determine, using the second early exit point, whether the second predictive result meets the accuracy threshold, and if so, stop processing the data unit using further output layers of the set of output layers in response to the second predictive result meeting the accuracy threshold; and determine whether the second predictive result does not meet the accuracy threshold, and if not process the data unit of the series using all remaining layers of the input-adaptive neural network, including a final output layer thereof.

8. The system of claim 7, wherein the first selected filter was selected further by:

determining the first output of the respective layer with the plurality of unranked filters;

determining the second output of the respective layer with the first set of the plurality of unranked filters;

determining a third output of the respective layer with a second set of the plurality of unranked filters, the second set comprising the plurality of unranked filters other than a second unranked filter of the plurality of unranked filters; and in response to the first difference between the first output and the second output being smaller than a second difference between the first output and the third output, selecting the first selected filter of the plurality of selected filters.

9. The system of claim 7, wherein the first selected filter was selected further by:

determining the first output of the respective layer with the plurality of unranked filters;

determining the second output of the respective layer with the first set of the plurality of unranked filters;

determining a third output of the respective layer with each of a plurality of second sets of the plurality of unranked filters, the plurality of second sets excluding the first set, a second set of the plurality of second sets comprising the plurality of unranked filters other than each of the plurality of unranked filters; and in response to the first difference between the first output and the second output being smaller than a second difference between the first output and the third output, selecting the first selected filter of the plurality of selected filters.

* * * * *